US012409876B2

(12) United States Patent
Lauderbaugh et al.

(10) Patent No.: US 12,409,876 B2
(45) Date of Patent: Sep. 9, 2025

(54) MOBILE LIFT TABLE

(71) Applicant: Vehicle Service Group, LLC, Madison, IN (US)

(72) Inventors: Gerry Lauderbaugh, Dupont, IN (US); Brad Gee, Madison, IN (US)

(73) Assignee: Vehicle Service Group, LLC, Madison, IN (US)

( * ) Notice: Subject to any disclaimer, the term of this patent is extended or adjusted under 35 U.S.C. 154(b) by 3 days.

(21) Appl. No.: 18/112,849

(22) Filed: Feb. 22, 2023

(65) Prior Publication Data

US 2023/0271640 A1     Aug. 31, 2023

Related U.S. Application Data

(60) Provisional application No. 63/314,226, filed on Feb. 25, 2022.

(51) Int. Cl.
    *B66F 7/06*        (2006.01)
    *B62B 3/02*        (2006.01)
    (Continued)

(52) U.S. Cl.
    CPC .................. *B62B 3/04* (2013.01); *B62B 3/02* (2013.01); *B62B 5/06* (2013.01); *B66F 3/12* (2013.01);
    (Continued)

(58) Field of Classification Search
    CPC .......... B66F 7/08; B66F 7/065; B66F 7/0683; B66F 7/28; B66F 7/0625; B66F 3/22;
    (Continued)

(56) References Cited

U.S. PATENT DOCUMENTS 4,027,878 A   *   6/1977   Dadbeh .................. A63D 15/00
                                                          473/29
4,278,031 A   *   7/1981   Dangschat ............. G01D 11/30
                                                           108/4

(Continued)

FOREIGN PATENT DOCUMENTS

| CN | 210313325 U | * | 4/2020 |
|---|---|---|---|
| CN | 216785602 U | | 6/2022 |
| DE | 20019269 U1 | | 4/2001 |

OTHER PUBLICATIONS

Multi-functional Scissor Lifting Platform; Document ID: CN 210313325 U; Date Published: Apr. 14, 2020; Inventor: Cai X, Gu J, Wang M, Zhang Y; Application No. 20514605; Application Date: Apr. 16, 2019 (Year: 2020).*

(Continued)

*Primary Examiner* — Mahdi H Nejad
(74) *Attorney, Agent, or Firm* — Frost Brown Todd LLP

(57) ABSTRACT

A lift table includes a base member, an air powered hydraulic powerpack assembly mounted to the base member, a tabletop, a lift assembly capable of actuated the tabletop relative to the base member, a handle extending upward from the base member, and an air supply docking station. The lift assembly includes a hydraulic cylinder assembly actuated by the air powered hydraulic powerpack. The handle includes a top portion of the handle elevated above the air-powered hydraulic powerpack. The air supply docking station is fixed to the top portion of the handle and is in fluid communication with the air-powered hydraulic powerpack assembly.

17 Claims, 26 Drawing Sheets

(51) Int. Cl.
- *B62B 3/04* (2006.01)
- *B62B 5/06* (2006.01)
- *B66F 3/12* (2006.01)
- *B66F 3/24* (2006.01)
- *B66F 7/08* (2006.01)
- *B66F 7/22* (2006.01)

(52) U.S. Cl.
CPC ............... *B66F 3/245* (2013.01); *B66F 7/08* (2013.01); *B66F 7/22* (2013.01); *B62B 2206/003* (2013.01); *B62B 2301/044* (2013.01); *B66F 7/0625* (2013.01); *B66F 7/065* (2013.01)

(58) Field of Classification Search
CPC ........ B66F 7/22; B66F 11/042; B66F 7/0666; B62B 3/02
See application file for complete search history.

(56) References Cited

U.S. PATENT DOCUMENTS

| | | | | |
|---|---|---|---|---|
| 5,372,353 | A * | 12/1994 | West | B25H 1/0007 254/DIG. 16 |
| 5,839,966 | A * | 11/1998 | Eisenhauer | A63D 15/00 473/29 |
| 6,132,320 | A * | 10/2000 | Spoerl | A63D 15/00 248/188.4 |
| 6,244,969 | B1 * | 6/2001 | Murphy | A63D 15/00 473/29 |
| 8,998,735 | B2 * | 4/2015 | Tsai | A63D 15/00 473/33 |
| 11,459,046 | B1 * | 10/2022 | Popoff | B62B 5/0006 |
| 11,584,627 | B2 | 2/2023 | Peterson et al. | |
| 2009/0184614 | A1 * | 7/2009 | Walsberg | A47B 91/024 312/351.3 |
| 2019/0241418 | A1 * | 8/2019 | Griffin | B66F 13/00 |
| 2021/0047159 | A1 | 2/2021 | Lauderbaugh et al. | |
| 2021/0316440 | A1 * | 10/2021 | Peterson | F16M 11/2092 |
| 2022/0041416 | A1 | 2/2022 | Viola | |
| 2022/0134820 | A1 * | 5/2022 | Peterson | B60D 1/36 414/563 |
| 2022/0402735 | A1 * | 12/2022 | Kritzer | B66F 9/065 |
| 2024/0150158 | A1 * | 5/2024 | Lauderbaugh | B23P 6/00 |

OTHER PUBLICATIONS

An Angle Adjustable Battery of Electric Lifter; Patent No. 108862100; Document ID: CN 108862100 A; Date Published: Nov. 23, 2018; Inventor: Gao Kong, Yu Xi-dong, Sun Hao; Date Filed: Jun. 29, 2018 (Year: 2018).*
A Tiltable Scissor-type Lifter; Patent No. 108373130; Document ID: CN 108373130 A; Date Published: Aug. 7, 2018; Inventor: Zhou, Wen-juan; Date Filed: May 14, 2018 (Year: 2018).*
Lifting Device and Electric Equipment; Document ID: CN 104787010 A; Date Published: Jul. 22, 2015; Inventor: Wang Wei, Shen Hao, Shen Hao; Date Filed: Apr. 13, 2015 (Year: 2015).*
A Power Battery Lifter and Method Thereof; Document ID: CN 108910756 A; Date Published: Nov. 30, 2018; Inventor: Zhang Yuan-hui, Cai Xi-lin, Wang Man-xiang; Date Filed: Aug. 28, 2018 (Year: 2018).*
Transfer Apparatus of in Air Conditioner for Railway Vehicle; Patent No. 20110043830; Document ID: KR 20110043830 A; Date Published: Apr. 28, 2011; Inventor: Park Chang Young; Date Filed: Oct. 22, 2009 (Year: 2011).*
SEMA Rotary Lift Table Demo; found at: https://www.facebook.com/RotarySolutions/videos/490938686426985/ (Year: 2022).*
Rotary LT33A Lift Table; found at: https://www.youtube.com/watch?v=k5TrB4f-aMM & https://vsgdover.com/en/rotary-lift/ (Year: 2022).*
Extended European Search Report and Written Opinion dated Jul. 27, 2023, for Application No. 2315076.2, 6 pages.

* cited by examiner

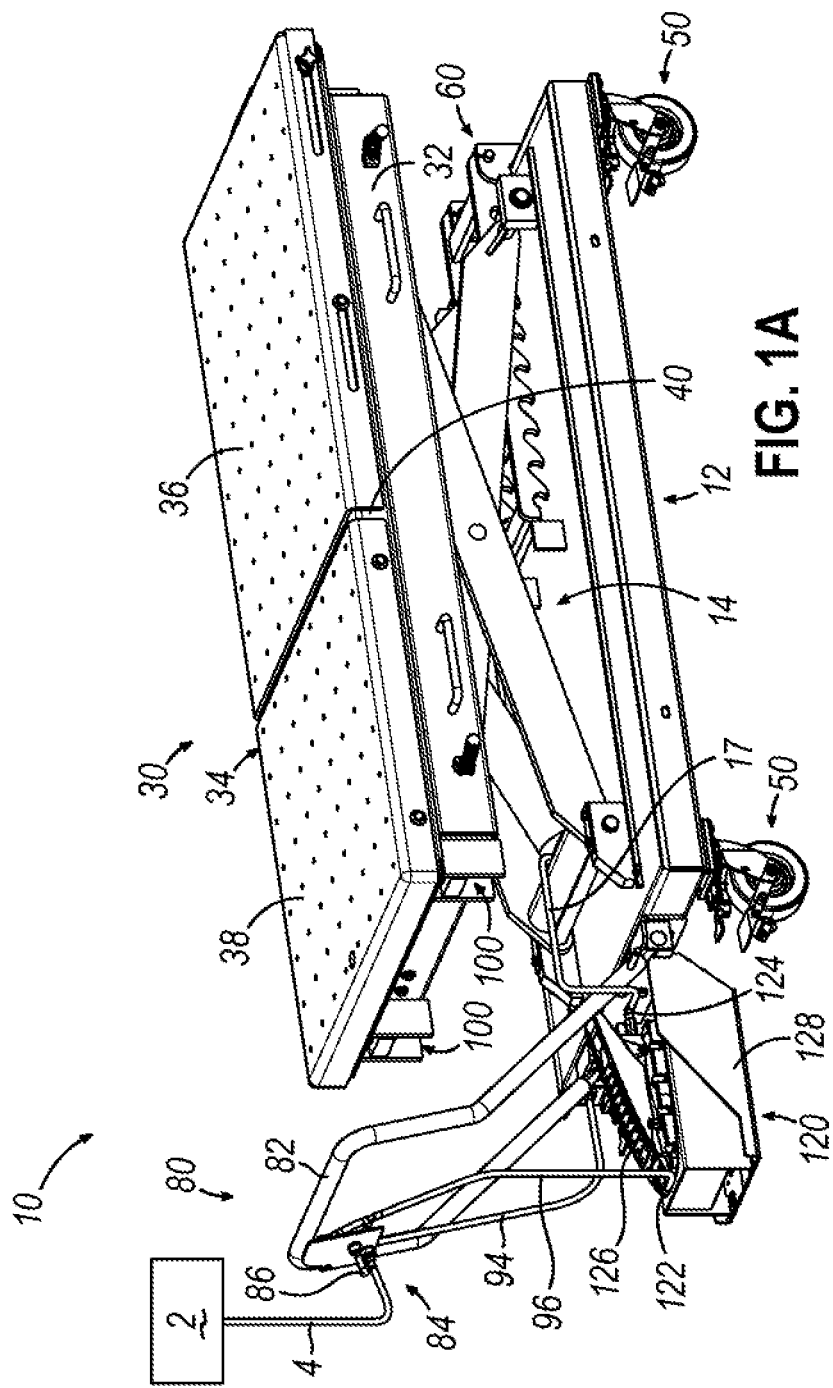

MOBILE LIFT TABLE

PRIORITY

This application claims priority to U.S. Provisional Application No. 63/314,226, entitled "Mobile Lift Table," filed on Feb. 25, 2022.

BACKGROUND

In some instances, it may be desirable to replace an electric vehicle ("EV") battery or a fuel cell (generically referred to herein as a "fuel unit") in a vehicle powered by such sources. In such instances, the previously used fuel unit may be removed from the vehicle and the replacement fuel unit may be installed. Once the previously used fuel unit is suitably removed, it may be desirable to position the replacement fuel unit on a mobile lift table in order to position the replacement fuel unit adjacent to the corresponding portions of the vehicle intended to receive and mount the replacement fuel unit. Therefore, in some instances, a mobile lift table is utilized to initially support a removed fuel unit once detached from the vehicle. Additionally, or alternatively, the mobile lift table may also be used to suitably elevate and position a replacement fuel unit such that a technician may suitably position the replacement fuel unit adjacent to corresponding mounting portions of the vehicle in order to install the replacement fuel unit on the intended vehicle.

While a variety of movable lift tables have been made and used, it is believed that no one prior to the inventor(s) has made or used an invention as described herein.

BRIEF DESCRIPTION OF THE DRAWINGS

While the specification may conclude with claims that particularly point out and distinctly claim the invention, it is believed the present invention will be better understood from the following description of certain examples taken in conjunction with the accompanying drawings, in which like reference numerals identify the same elements and in which:

FIG. 1A is a perspective view of an illustrative lift table in a lowered position;

Figure 1B:
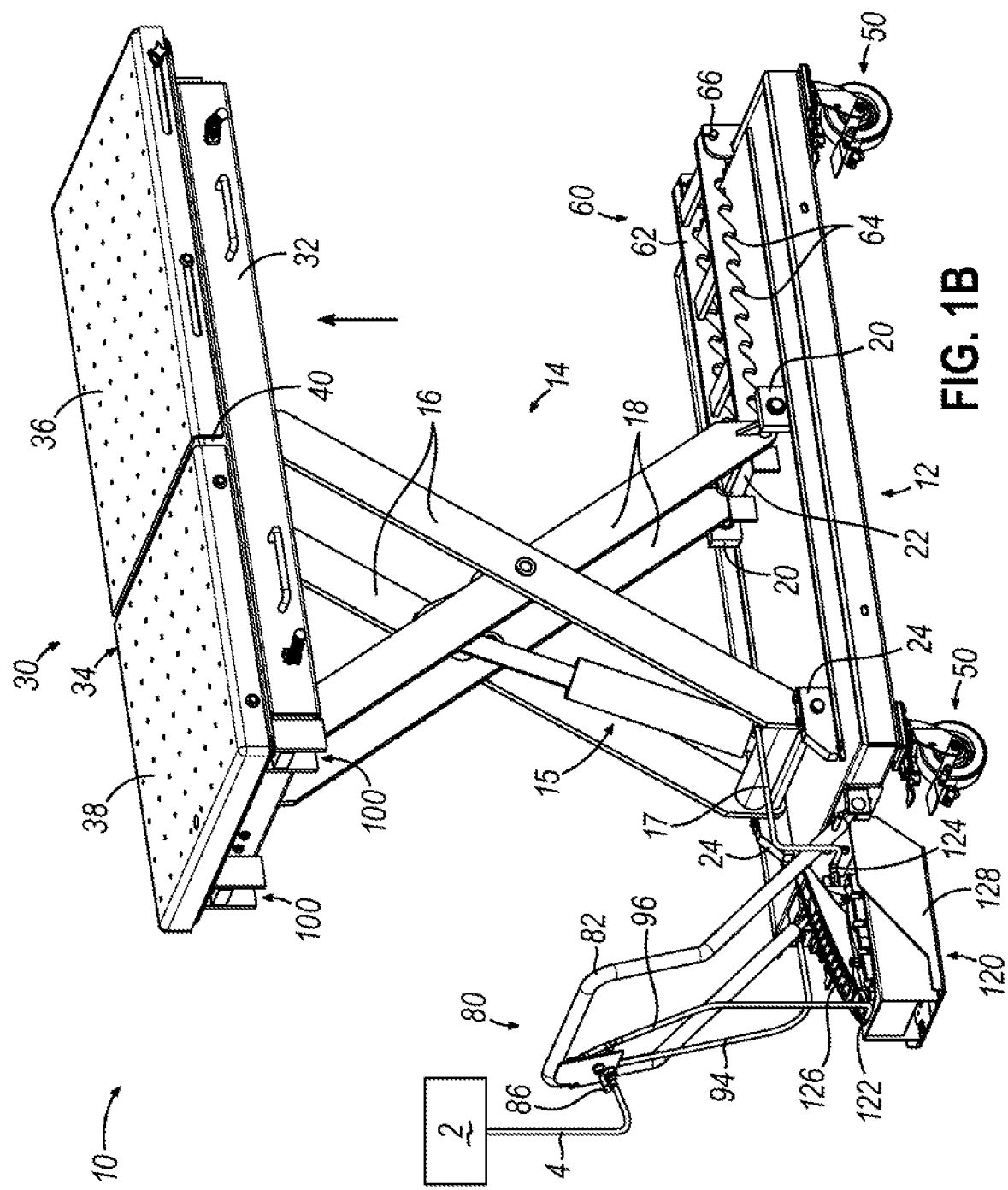
FIG. 1B is a perspective view of the lift table of FIG. 1A in a raised position, where a tabletop assembly is in a non-extended position and a non-tilted position.
Figure 1C:
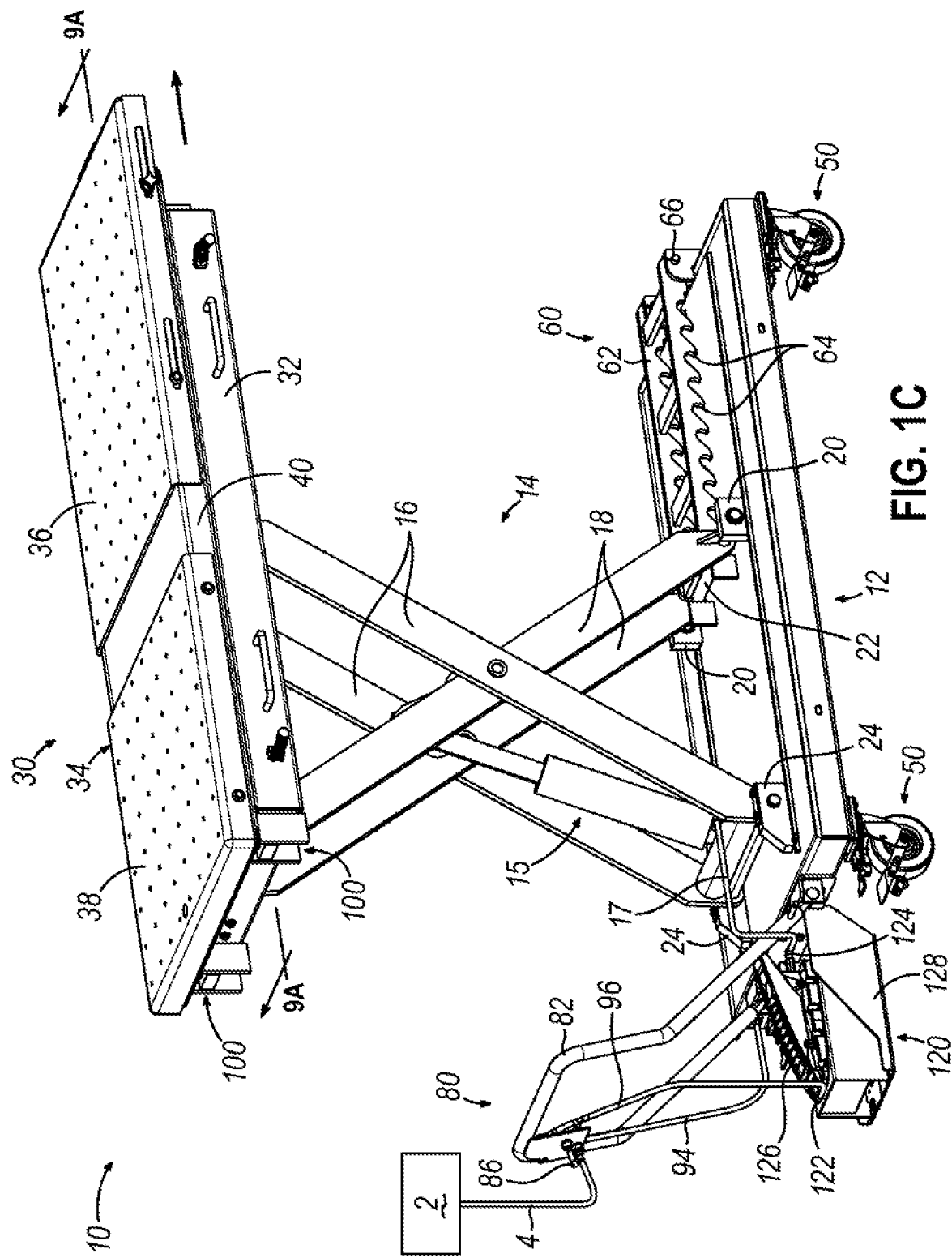
FIG. 1C is a perspective view of the lift table of FIG. 1A in the raised position, where the tabletop assembly of FIG. 1B is in an extended position and the non-tilted position.
Figure 1D:
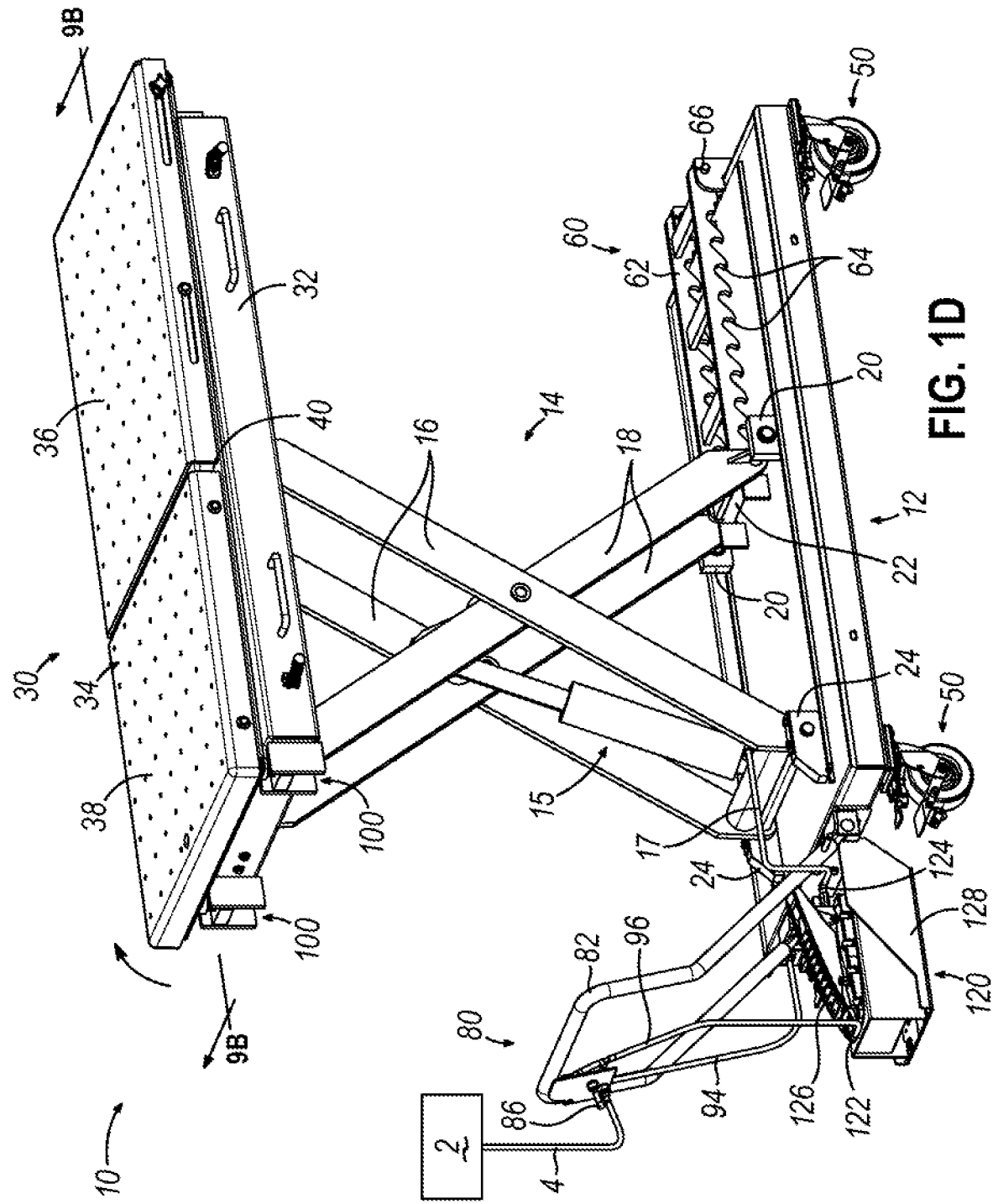
FIG. 1D is a perspective view of the lift table of FIG. 1A in the raised position, where the tabletop assembly of FIG. 1B is in the extended position and a tilted position.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the resent invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is, by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Illustrative Overview and Use of Mobile Lift Table

As mentioned above, in instances where a replacement EV fuel unit is being installed on an electric vehicle ("EV"), a lift table may be used to remove the old EV fuel unit and also used to suitably position the replacement EV battery for installation. FIGS. 1A-1D show an illustrative mobile lift table (10) that may be used to remove used EV fuel units from a vehicle, and/or position a replacement EV fuel unit adjacent to intended mounting structures of a vehicle such that the replacement EV fuel unit may be suitable installed.

As best shown in FIGS. 1A-1D, mobile lift table (10) includes a base (12), a scissor lift assembly (14), a tabletop assembly (30), a lift lock assembly (60), a handle assembly (80), and an air-powered hydraulic powerpack assembly (120). Four lockable swivel castor wheels (50) are attached to base (12) such that mobile lift table (10) may easily be moved around a shop floor. Additionally, handle assembly (80) includes a handle (82) that is fixed to, and extends upwardly from, base (12) such that a technician may utilize handle assembly (80) to move lift table (10) around the shop floor.

Scissor lift assembly (14) is interposed between base (12) and tabletop assembly (30) such that scissor lift assembly (14) may actuate tabletop assembly (30) relative to base (12) between a lowered position (see FIG. 1A), a raised position (see FIG. 1B), and a multitude of positions between the lowered and raised positions. Scissor lift assembly (14) includes a hydraulic cylinder assembly (15), a first pair of legs (16), and a second pair of legs (18) pivotally coupled to first pair of legs (16). Each pair of legs (16, 18) are pivotally attached to base (12) and tabletop assembly (30). Additionally, one end of each pair of legs (16, 18) is both slidably and pivotally attached to a respective component, while the opposite end of each pair of legs (16, 18) is pivotally attached and slidably constrained relative to a respective component.

For example, legs (18) are pivotally attached to a pair of sliding blocks (20) associated with base (12) via rod (22); while legs (16) are pivotally attached to a pair of static blocks (24) associated with base (12). Sliding blocks (20) are configured to translate along a predetermined path relative to base (12), while static blocks (24) are substantially fixed relative to base (12). Therefore, as tabletop assembly (30) actuates between the lowered position and the raised position in accordance with the description herein, as shown between FIGS. 1A-1B, both pairs of legs (16, 18) pivot relative to their respect blocks (24, 22). However, legs (18) and sliding block (22) translate relative to base (12); while static blocks (24) and legs (16) do not translate relative to base (12). It should be understood that ends of legs (16) that are pivotally associated with tabletop assembly (30) are configured such that legs (16) translate and pivot relative to tabletop assembly (30); while legs (18) pivot without translating relative to tabletop assembly (30).

Scissor lift assembly (14) also includes a hydraulic cylinder assembly (15) configured to extend and retract in order to raise and lower tabletop assembly (30) in accordance with the description herein. In the current aspect of the disclosure, one end of hydraulic cylinder assembly (15) is pivotally attached to base (12), while the other end of hydraulic cylinder assembly (15) is pivotally attached to legs (18). Hydraulic cylinder assembly (15) is configured to extend such that ends of hydraulic cylinder assembly (15) connected to base (12) and legs (18) separate from each other, thereby driving legs (16, 18) upward. The pivotal and sliding relationship between legs (16, 18), base (12), and tabletop assembly (30) allows legs (16, 18) to lift tabletop assembly (30) upward in response to extension of hydraulic cylinder assembly (15). Conversely, hydraulic cylinder (15) is configured to retract such that ends of hydraulic cylinder assembly (15) connected to base (12) and legs (18) become closer to each other, thereby driving legs (16, 18) downward. The pivotal and sliding relationship between legs (16, 18), base (12), and tabletop assembly (30) allows legs (16, 18) to lower tabletop assembly (30) downward in response to retraction of hydraulic cylinder assembly (15).

Air-powered hydraulic powerpack assembly (120) is configured drive hydraulic cylinder assembly (15) to extend and retract in accordance with the description herein to thereby raise and lower tabletop assembly (30) relative to base (12). Air-powered hydraulic powerpack assembly (120) is mounted to base (12) and includes air input (122), a hydraulic fluid output (124), a foot switch (126), and a hydraulic powerpack assembly (128). Air input (122) is configured to receive compressed air from a compressor (2) and communicate the compressed air to hydraulic powerpack assembly (128). Hydraulic powerpack assembly (128) is configured to utilize the compressed air received from compressor (2) in order to drive hydraulic fluid toward hydraulic cylinder assembly (15) via hydraulic fluid output (124) and via a hydraulic fluid line (17). Foot switch (126) may be utilized by a technician in order to selectively activate hydraulic powerpack assembly (128) to either drive hydraulic fluid toward, and thereby extend, hydraulic cylinder assembly (15), or to selectively receive hydraulic fluid from, and thereby retract, hydraulic cylinder assembly (15). Therefore, a technician may control air-powered hydraulic powerpack assembly (120) with their foot via switch (126) in order to selectively raise and lower lift table (10) in accordance with the description herein.

It should be understood that air-powered hydraulic powerpack assembly (120) may include any suitable components as would be apparent to one skilled in the art in view of the teachings herein. For example, foot switch (126) and hydraulic powerpack assembly (128) may include any suitable components as would be apparent to one skilled in the art in view of the teachings herein.

Tabletop assembly (30) includes a scissor lift engagement base (32), an adjustable top assembly (34), and a tilt adjustment assembly (100). Tabletop assembly (30) is configured to receive and support an object to be lifted. For example, tabletop assembly (30) may be utilized to support an EV fuel unit to remove such a fuel unit, or to install such a fuel unit onto a vehicle. Scissor lift engagement base (32) is suitably engaged with scissor lift assembly (14) such that scissor lift assembly (14) may elevate tabletop assembly (30) relative to base (12) via scissor lift engagement base (32). Scissor lift engagement base (32) may include any suitable components as would be apparent to one skilled in the art in view of the teachings herein.

Adjustable top assembly (34) includes a first end plate (36), a second end plate (38), and a central plate (40). Central plate (40) is suitably engaged with scissor lift engagement base (32) such that adjustable top assembly (34) actuates with scissor lift engagement base (32) in response to operation of scissor lift assembly (14) in accordance with the description herein. As will be described in greater detail below, central plate (40) is pivotally coupled with scissor lift engagement base (32). As best shown between FIGS. 1B-1C, end plate (36) may be adjustable relative to central plate (40) such that the overall length of tabletop assembly (30) may be selectively adjusted. Therefore, a technician may customize the length of tabletop assembly (30) during illustrative use in accordance with the description herein. Any suitable components may be utilized in order to allow end plate (36) to adjust relative to central plate (40) as would be apparent to one skilled in the art in view of the teachings herein.

Figure 2:
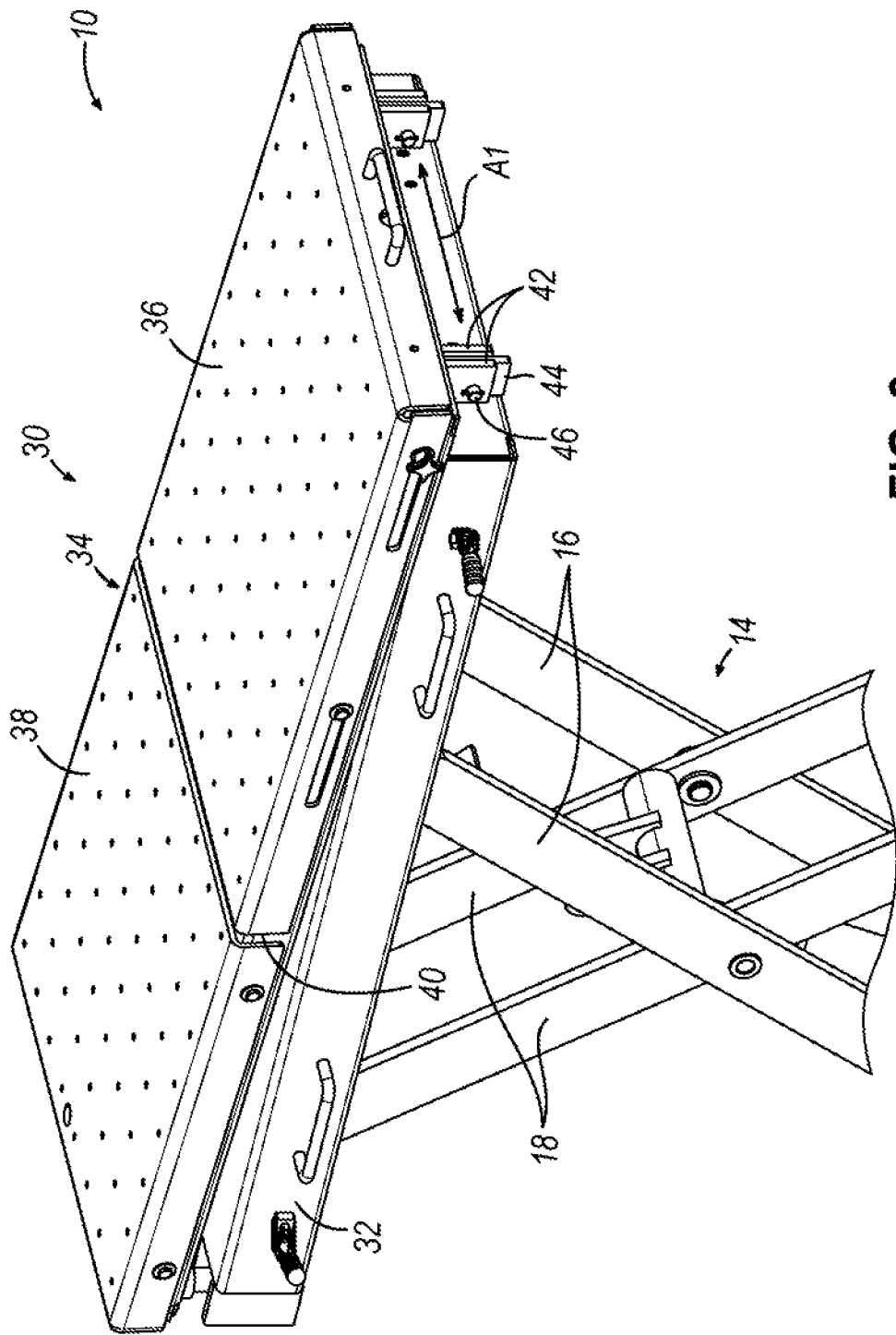
FIG. 2 is another perspective view of the tabletop assembly of FIG. 1B is in the extended position and a tilted position.

As best shown in FIG. 2, adjustable top assembly (34) is pivotally coupled to scissor lift engagement base (32). In particular, central plate (40) includes a pair of yokes (42) on one end that are dimensioned to receive a respective flange (44) that is fixed to an end of scissor lift engagement base (32). Yokes (42) are pivotally coupled to a respective flange (44) via pin (46) extending along a pivot axis (A1). Since yokes (42) are fixed to central plate (40) and flanges (44) are fixed to scissor lift engagement base (32), adjustable top assembly (34) is configured to rotate relative to scissor lift engagement base (32) about pivot axis (A1). As will be described in greater detail below, and as shown between FIGS. 1C-1D, tilt adjustment assemblies (100) are configured to pivot adjustable top assembly (34) relative to scissor lift engagement base (32) about pivot axis (A1) into various tilt angles.

Therefore, during illustrative use of mobile lift table (10), a technician may move lift table (10) around a shop floor to a desired location by grasping handle (82) of handle assembly (80). Once a technician desires to elevate lift (10) table as shown between FIGS. 1A-1B, they may utilize foot switch (126) in accordance with the description herein. It should be understood that a technician may lower lift table (10), as shown between FIGS. 1B-1A, utilizing foot switch (126) as well. As shown between FIGS. 1B-1C, if the technician desires to change the length of adjustable top assembly (34), they may extend or retract first end plate (36) along a predetermined path defined by central plate (40) until top assembly (34) reaches a desired length. It should be understood that a technician may selectively lock the length of end plate (36) utilizing any suitable component as would be apparent to one skilled in the art in view of the teachings herein.

In some instances, a technician may need to slightly tilt adjustable top assembly (34). For example, it may be desirable to tilt top assembly (34) in order to better position a fuel unit to be installed on a vehicle. As shown between FIGS. 1C-1D, a technician may utilize tilt engagement assembly (100) in accordance with the description herein to rotate top assembly (34) about pivot axis (A1) relative to base (32) into a desired position.

II. Illustrative Air Supply Docking Station and Routing

As mentioned above, air-powered hydraulic powerpack assembly (120) is configured to drive hydraulic cylinder assembly (15). In particular, air input (122) is configured to receive compressed air in order to render air-powered hydraulic powerpack assembly (120) operable. Previously, when a technician desired to couple an air-powered hydraulic powerpack assembly to a source of compressed air after suitably placing lift table (10) in a desired location, the technician would directly couple a compressor hose (4) extending directly from the air compressor (2) with air input (122) associated with air-powered hydraulic powerpack assembly (120). However, as mentioned above, air-powered hydraulic powerpack assemblies are mounted onto base (12) and configured to be controlled with the foot of a technician. Therefore, when a technician desires to render air-powered hydraulic powerpack assembly (120) operable after lift table (10) is rolled into position, they must bend over in order to make the direct air connection between hose (4) and air input (122). This may be inefficient and less ergonomic than desired. Therefore, it may be desirable to have an air supply docking station located at a more convenient and ergonomic location on lift table (10).

Figure 3:
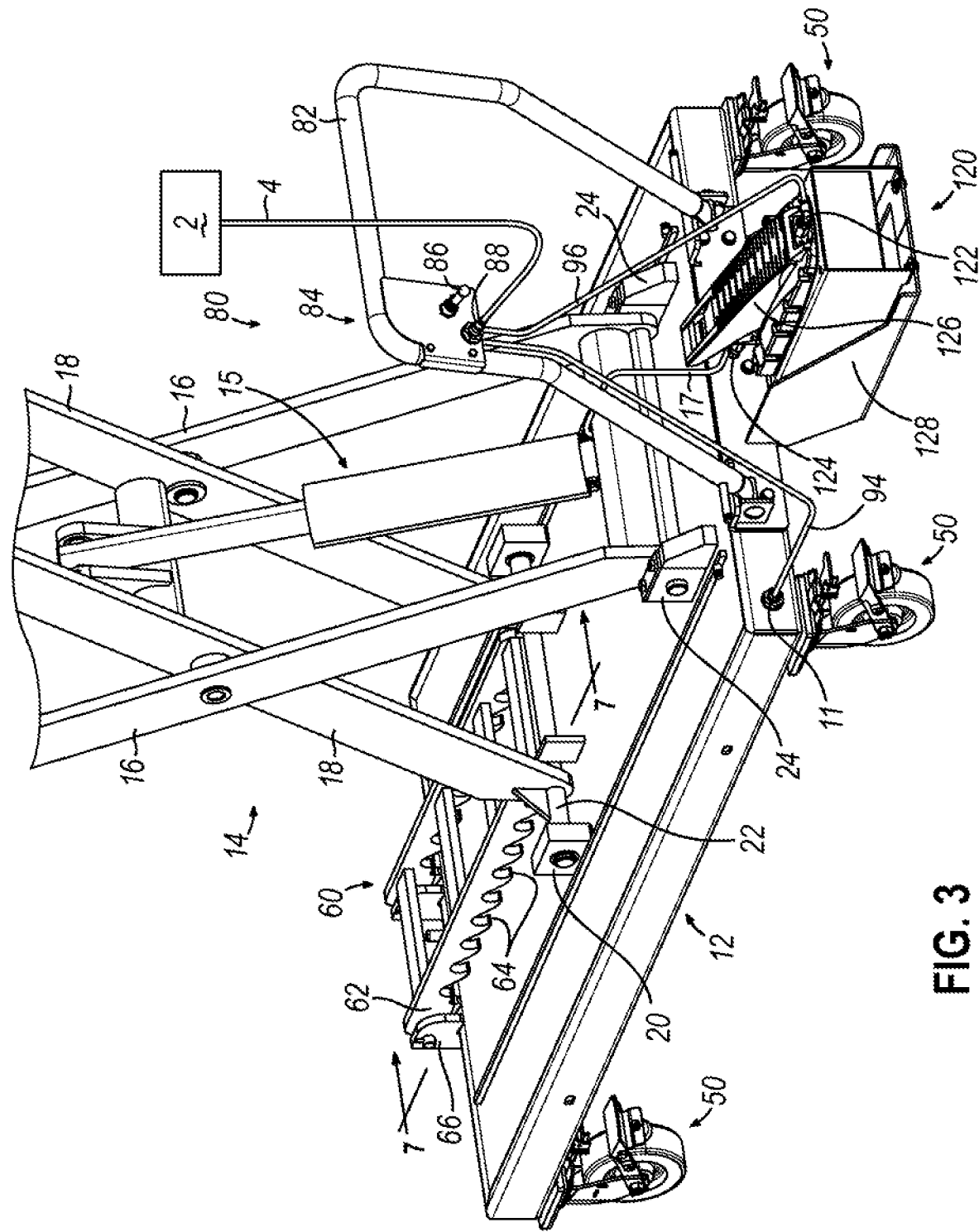
FIG. 3 is a perspective view of a lower portion of the lift table of FIG. 1A.
Figure 4:
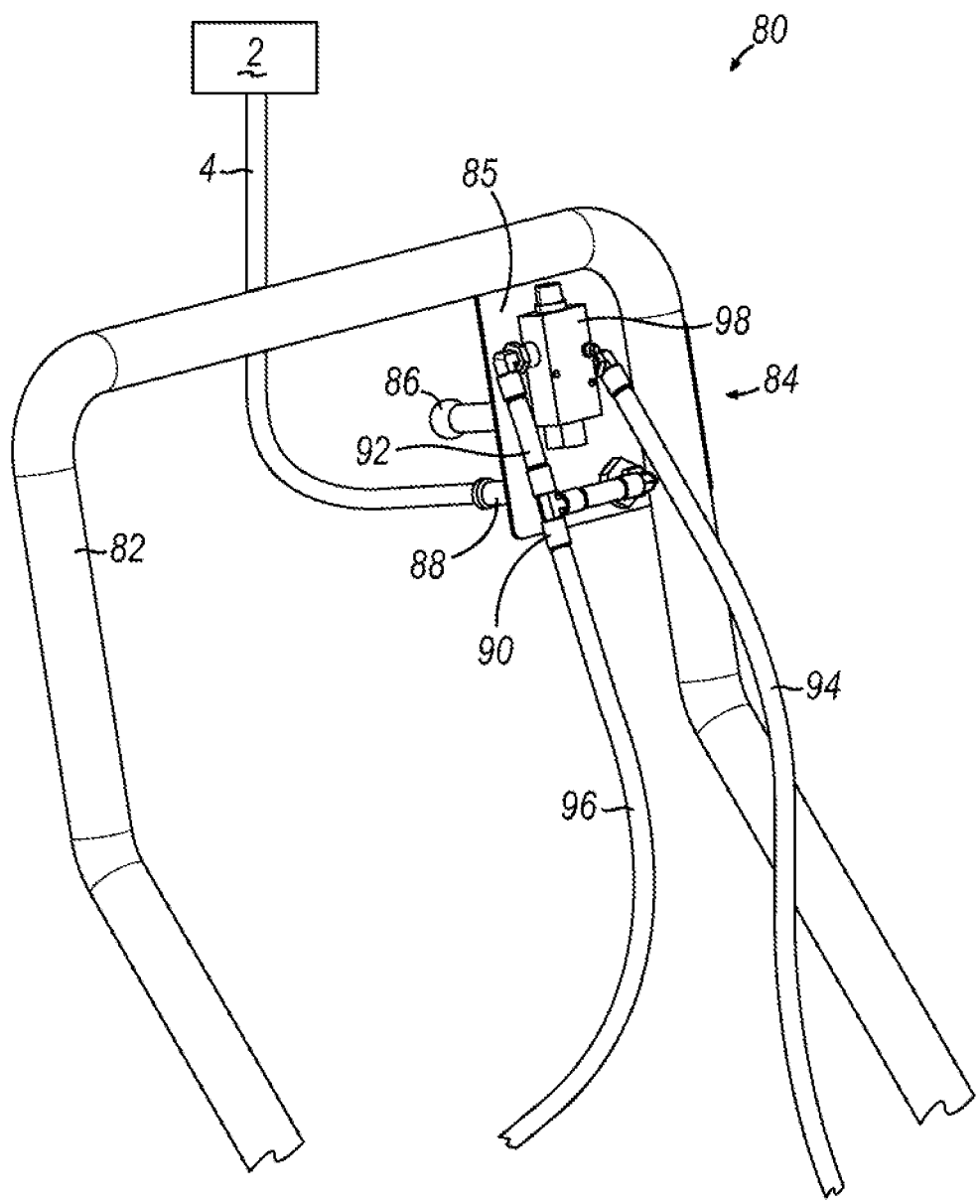
FIG. 4 is a perspective view of a handle assembly of the lift table of FIG. 1A.
Figure 5:
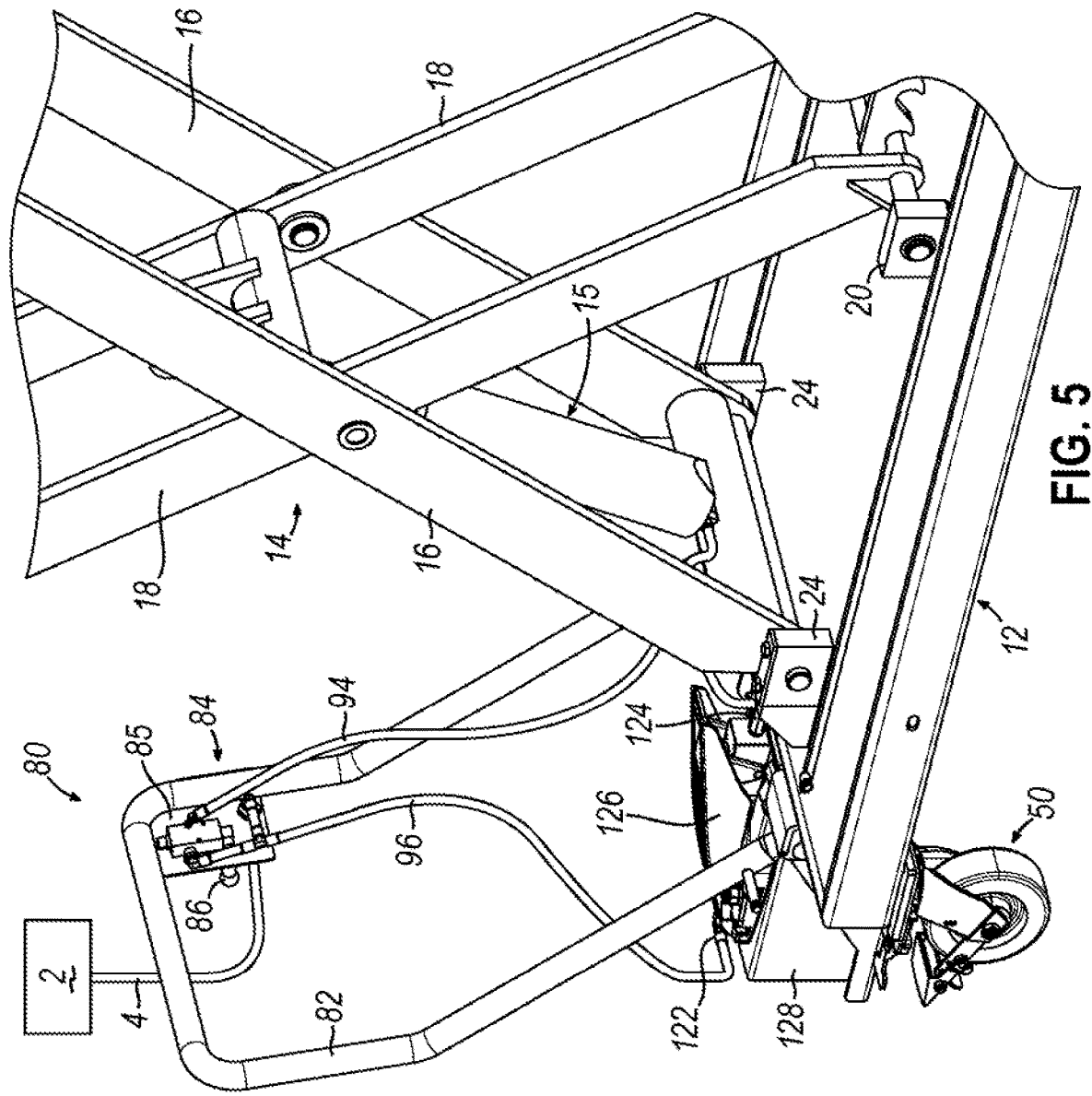
FIG. 5 is a perspective view of the handle assembly of FIG. 4 and the lower portion of FIG. 3.

FIGS. 3-5 show an illustrative air supply docking station (84) incorporated into handle assembly (80). As will be described in greater detail below, docking station (84) is configured to directly couple with a supply of compressed air, such as a compressor hose (4) extending from a compressor (2), at a convenient and ergonomic location such that a technician does not have to overly bend over to establish such an initial connection.

Air supply docking station (84) includes a panel (85), an air-lock switch (86), a coupling port (88), a T-connector (90), an air lock input (92), an air lock output (94), a power pack input line (96), and an air lock valve assembly (98). Panel (85) is fixed to an upper portion of handle (82) such that panel (85) may be easily accessed by a technician during illustrative use of lift (10) in accordance with the description herein. Therefore, a technician may access panel (85) without having to bend over or utilize any other type of unergonomic body positioning. An air lock switch (86) and air coupling port (88) extended away from panel (85) and the rest of lift table (10) such that both switch (86) and port (88) present themselves to a technician utilizing handle (82) of lift table (10). Air coupling port (88) is configured to directly couple with a compression hose (4) that may be coupled to an air compressor (2) located on the shop floor. Therefore, a technician may easily couple an air compressor to air coupling port (88) without having to bend over.

As best shown in FIG. 4, a portion of coupling port (88) extends through and rear side of panel (85) such that coupling port (88) is in fluid communication with a T-connector (90). T-connector (90) is in fluid communication with both air lock input (92) and power pack input line (96). Air lock input (92) is fluidly coupled with air lock valve assembly (98). Air lock valve assembly (98) is normally closed, but it may open in response to actuation of air lock switch (86). As will be described in greater detail below, air lock switch (86), air lock valve assembly (98), air lock input (92), and air lock output (94) are configured to actuate a pneumatic actuator (72) of locking assembly (60).

As best shown in FIGS. 4-5, powerpack input line (96) extends from T-connector (90) and couples with air input (122) of air-powered hydraulic powerpack assembly (120). Therefore, air-powered hydraulic powerpack assembly (120) is in fluid communication with coupling port (88) of air supply docking station (84) via T-connector (90). During illustrative use of lift table (10), when a technician desires to render air-powered hydraulic powerpack assembly (120) operable after lift table (10) is rolled into position, the technician may simply couple air hose (4) directly to coupling port (88), thereby rending air-powered hydraulic powerpack assembly (120) operable without having to bend over or kneel down in order to attach air hose (4) directly to air input (122) of air-powered hydraulic powerpack assembly (120).

Fluid communication between air coupling port (88) and air-powered hydraulic powerpack assembly (120) is generally unimpeded due to the fluid connection between T-connector (90) and air lock valve assembly (98) since air lock valve assembly (98) is in a normally closed position. In other words, while air lock valve assembly (98) is in the normally closed position, there is generally no air pressure escaping from T-connector (90) via air lock input (92) such that compressed air provided to coupling port (88) travels to air-powered hydraulic powerpack assembly (120) for illustrative use in accordance with the description herein.

III. Illustrative Table Locking Assembly with Air Powered Locks

As mentioned above, lift table (10) includes a locking assembly (60) associated with base (12). Locking assembly (60) is configured to transition between a locked configuration (see FIGS. 7A and 7D) and an unlocked configuration (see FIGS. 7B and 7C). In the locked configuration, locking assembly (60) is configured to allow scissor lift assembly (14) to raise tabletop assembly (30) to a desired elevation while also inhibiting scissor lift assembly (14) from lowering. In the unlocked configuration, locking assembly (60) is suitably disengaged from scissor lift assembly (14) such that scissor lift assembly (14) may raise and lower tabletop assembly (30) in accordance with the description herein. Therefore, if hydraulic pressure were to escape from hydraulic cylinder assembly (15) while tabletop assembly (30) is elevated and locking assembly (60) is in the locked configuration, locking assembly (60) would inhibit tabletop assembly (30) from accidentally lowering. When a technician desires to lower tabletop assembly (30) they may actuate locking assembly (60) into the unlocked configuration and then lower tabletop assembly (30) in accordance with the description herein.

On previous lift tables, an actuator configured to drive a locking assembly between the locked and unlocked configuration would be controlled by a manually driven cable assembly (similar to bicycle brakes). However, use of such manually driven cable assemblies may provide inconsistent operation of the locking assembly. Therefore, it may be desirable to have more consistent operation of a locking assembly as compared to using manual cables to a drive locking assembly. As will be described in greater detail below, locking assembly (60) of lift table (10) is controlled by an air cylinder (70) having a pneumatic actuator (72), which provides more consistent operation of locking assembly (60) compared to previous locking assemblies.

Figure 6:
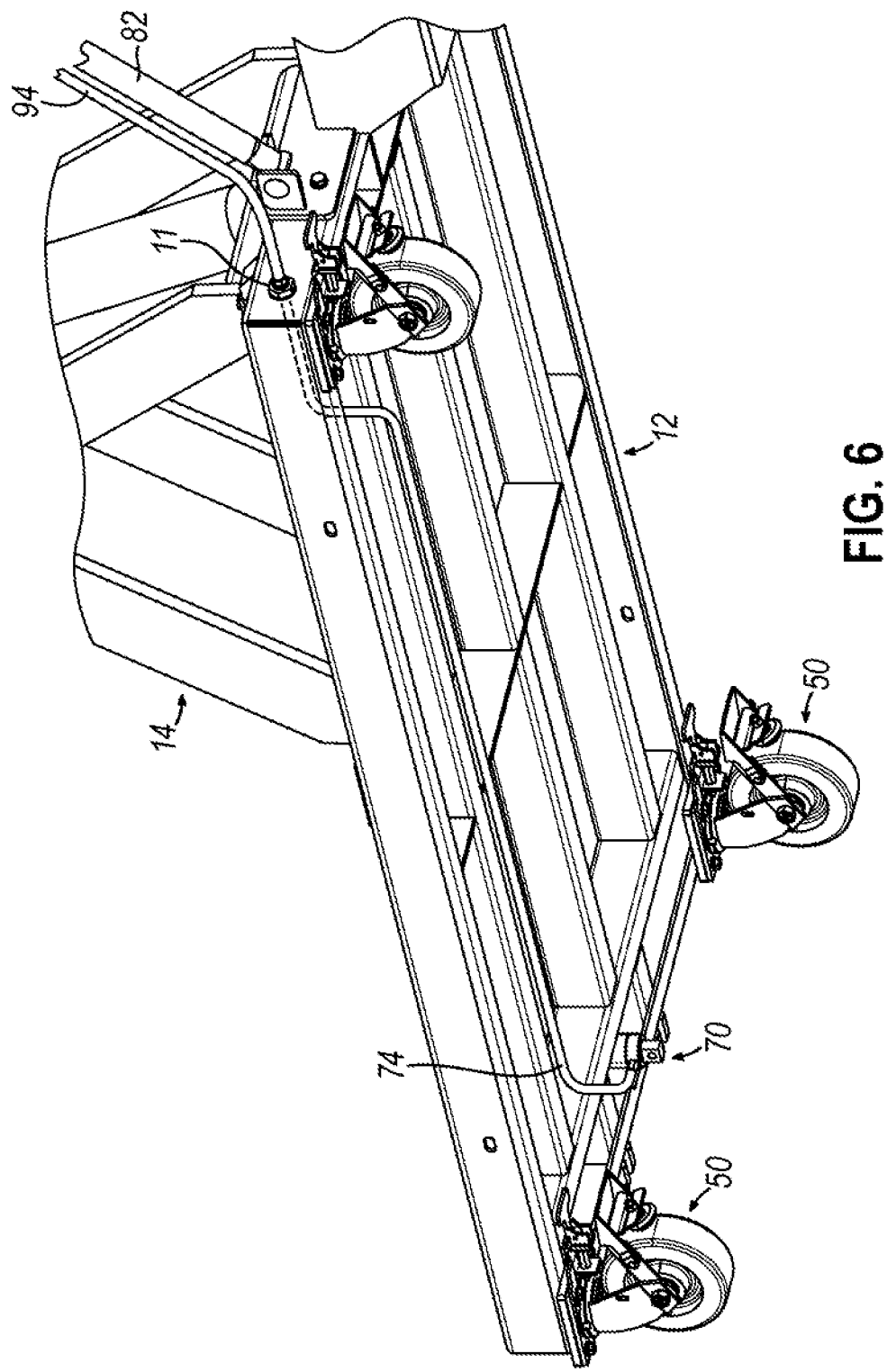
FIG. 6 is a perspective view of the underside of the lower portion of FIG. 3.
Figure 7A:
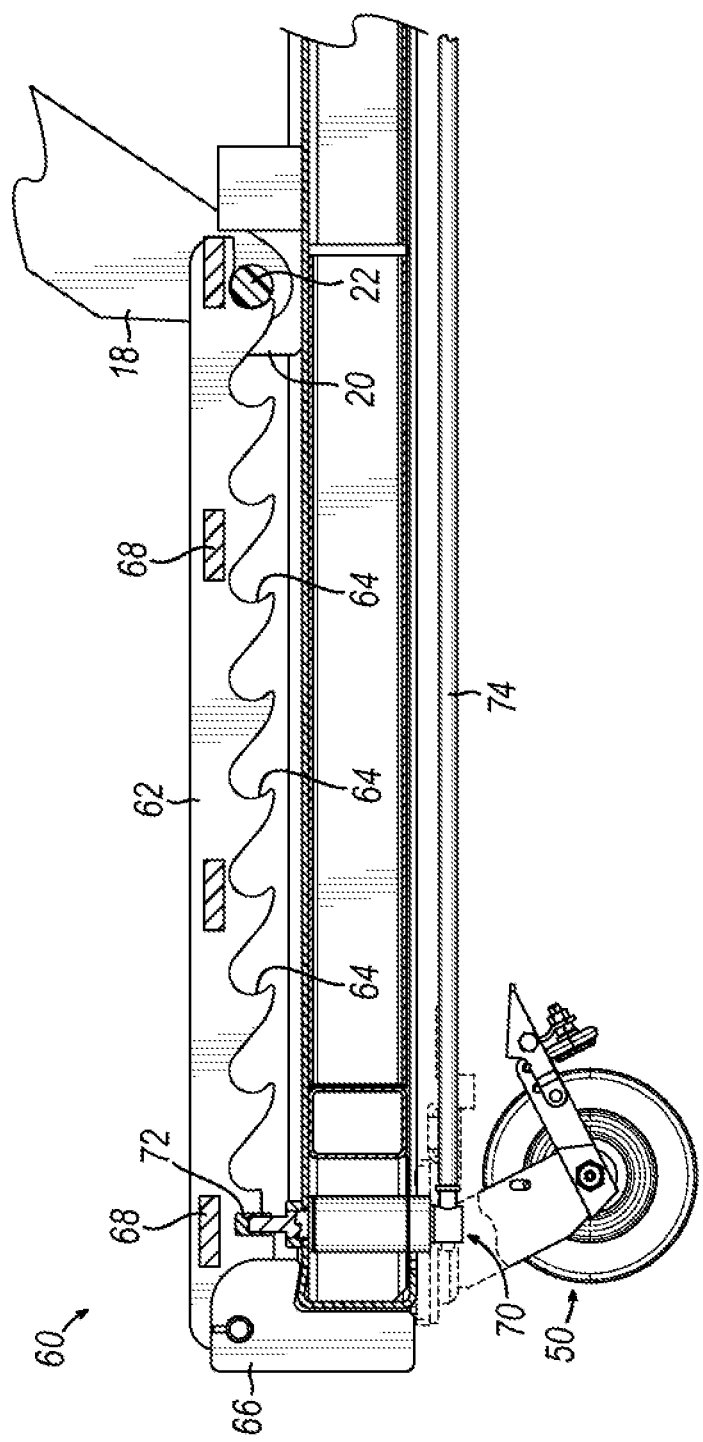
FIG. 7A is a sectional view of a locking assembly of the table lift of FIG. 1A, taken along line 7-7 of FIG. 3, where the table lift is in a first elevated position and the locking assembly is in a locked position.
Figure 7B:
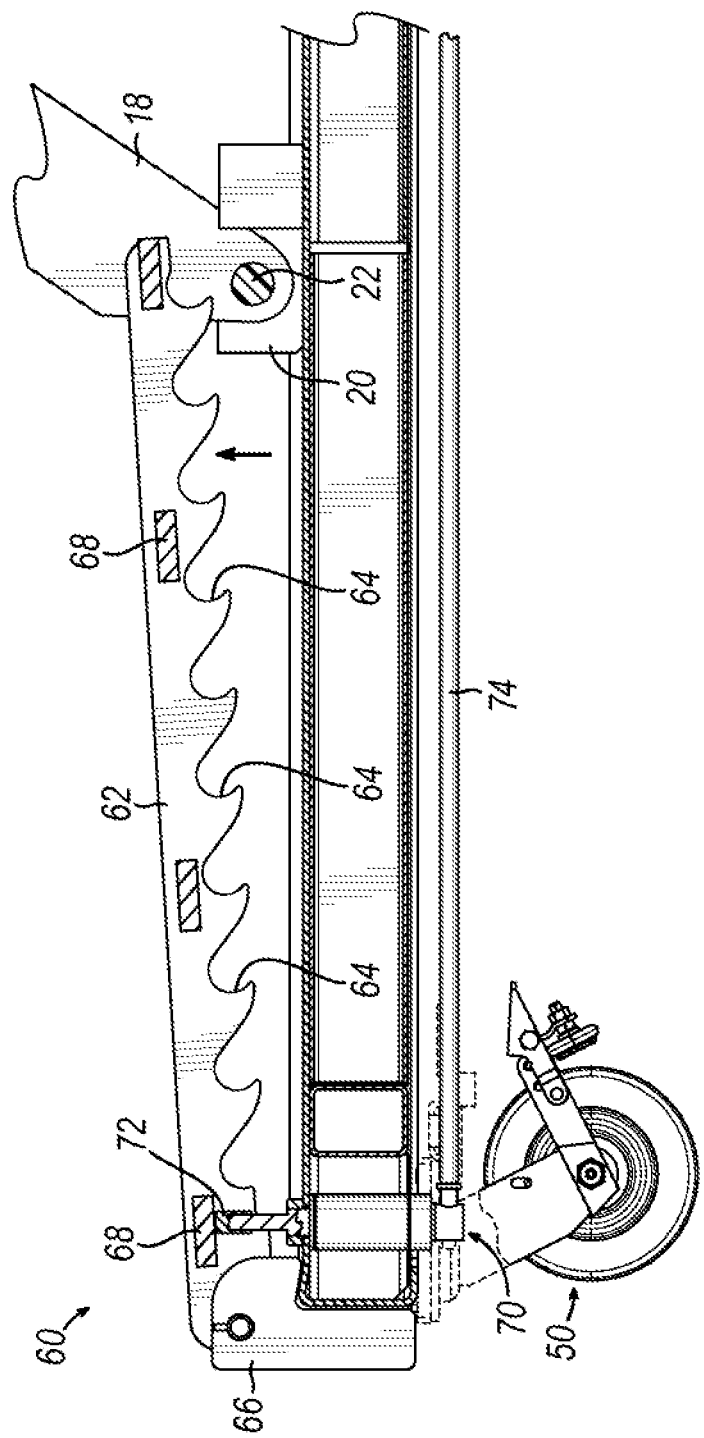
FIG. 7B is a sectional view of the locking assembly of FIG. 7A, taken along line 7-7 of FIG. 3, where the table lift is in the first elevated position and the locking assembly is in an unlocked position.
Figure 7C:
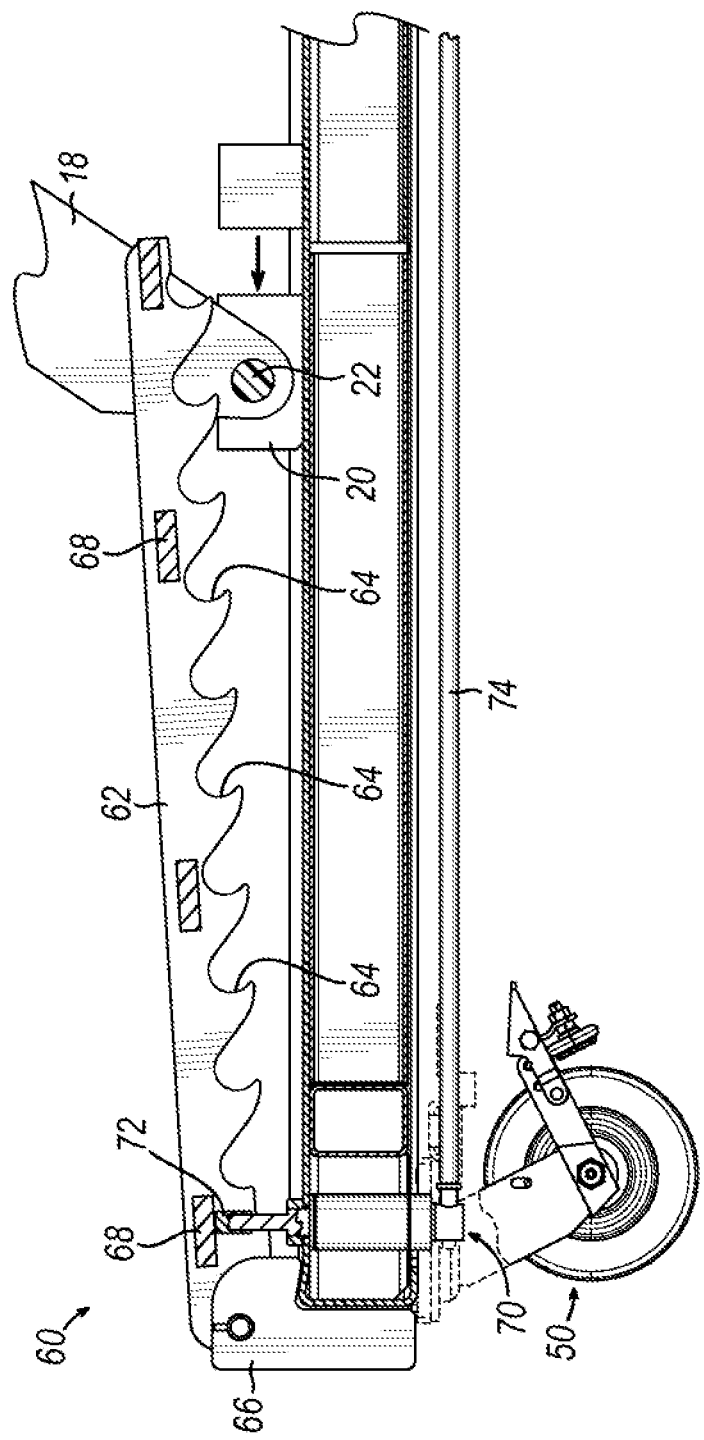
FIG. 7C is a sectional view of the locking assembly of FIG. 7A, taken along line 7-7 of FIG. 3, where the table lift is in a second elevated position and the locking assembly is in the unlocked position.
Figure 7D:
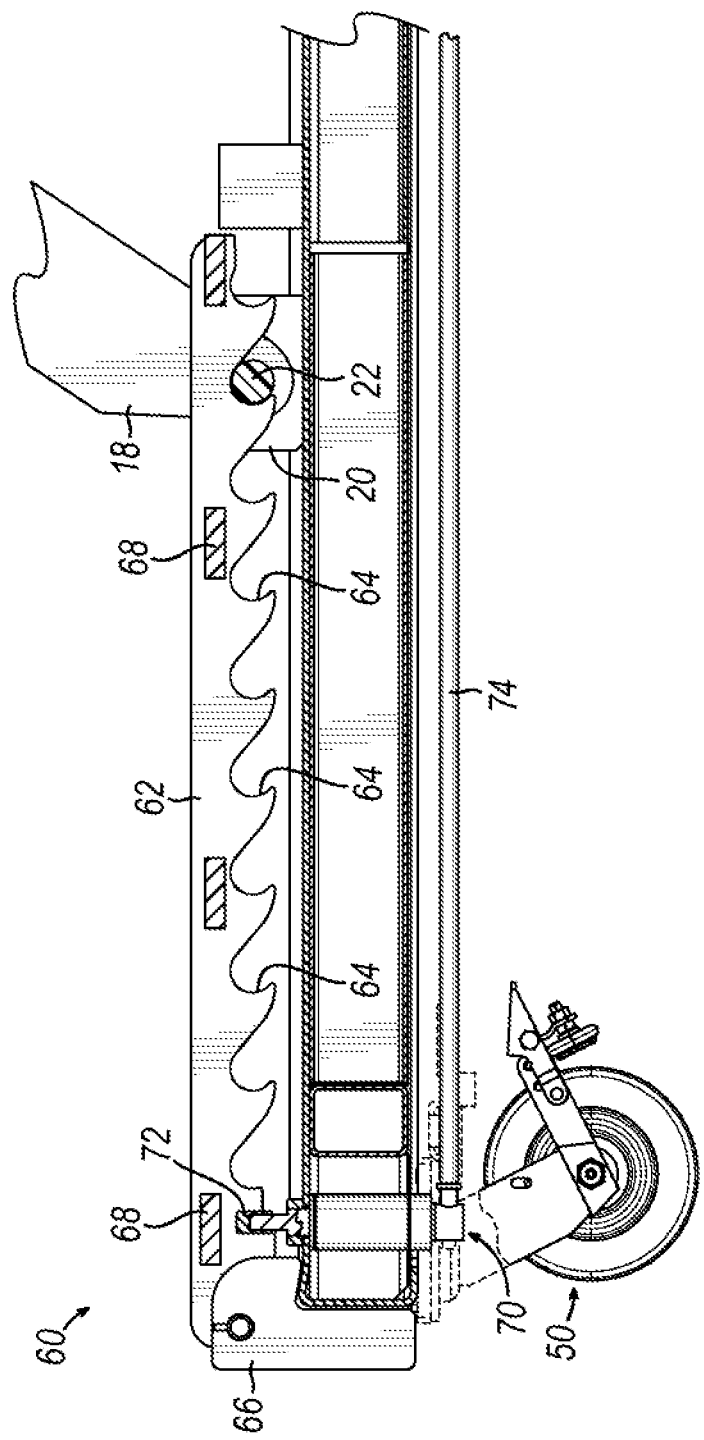
FIG. 7D is a sectional view of the locking assembly of FIG. 7A, taken along line 7-7 of FIG. 3, where the table lift is in the second elevated position and the locking assembly is in the locked position.

FIGS. 7A-7D show locking assembly (60), while FIGS. 4-6 show a fluid communication path between coupling port (88) and air cylinder (70) of locking assembly (60). Locking assembly (60) includes a pivoting locking ladder (62) having an array of locking teeth (64), a yoke (66) pivotally coupling locking ladder (62) to base (12), cross-bracing (68) extending from locking ladder (62), and an air cylinder (70) having an actuator (72) configured to drive locking assembly (60) between the locked configuration and the unlocked configuration. The weight of locking ladder (62) biases locking assembly (60) into the locked configuration. While locking assembly (60) is in the locked configuration as shown in FIGS. 7A and 7D, array of locking teeth (64) is configured to allow rod (22) and slide blocks (20) to actuate in a first direction associated with scissor lift assembly (14) elevating tabletop assembly (30). Additionally, while locking assembly (60) is in the locked configuration, array of locking teeth (64) is configured to inhibit rod (22) and slide blocks (20) from actuating in a second, opposite direction, associated with scissor lift assembly (14) lowering tabletop assembly (30).

Air cylinder (70) is mounted to base (12). Air cylinder (70) is configured to selectively drive locking ladder (62) into the unlocked configuration by driving actuator (72) into engagement with cross-bracing (68) to thereby pivot locking ladder (62) upwards, such that locking teeth (64) are spaced way from, and thereby inhibited from engaging, rod (22). As best shown in FIG. 6, air cylinder (70) is in fluid communication with an air supply line (74) that extends along the underside of base (12). Air supply line (74) is also in fluid communication with an air hose port (11) of base (12). As best shown between FIGS. 4-6, air hose port (11) of base (12) is in fluid communication with air lock valve assembly (98) via air lock output (94). Therefore, when coupling port (88) is suitably coupled with air compressor (2) via hose (4), a technician may actuate air lock switch (86) to open air lock valve assembly (98). Opening air lock valve assembly (98) allows compressed air from air compressor (2) to travel to air cylinder (70) via hose (4), coupling port (88), T-connector (90), air lock input (92), air lock valve assembly (98), air lock output (94), air hose port (11), and air supply line (74). Compressed air traveling from compressor (2) to air cylinder (70) drives actuator (72) upward into engagement with cross-bracing (68) and therefore pivots locking ladder (62) into the unlocked position. Therefore, when coupling port (88) is suitably coupled with air compressor (2) via hose (4), a technician may utilize air lock switch (86) located at panel (85) in order to selectively drive locking assembly (60) into the unlocked configuration.

FIGS. 7A-7D show an illustrative use of locking assembly (60) to selectively lower tabletop assembly (30). First, as shown in FIG. 7A, rod (22) and sliding blocks (20) are positioned relative to base (12) such that tabletop assembly (30) is in the completely elevated position (see FIG. 1B). Additionally, the last locking tooth (64) of the array is engaged with rod (22), thereby inhibiting scissor assembly (14) from lowering tabletop assembly (30). If the technician desires to lower tabletop assembly (30), the technician may activate air lock switch (86) such that actuator (72) is driven upward into suitable engagement with cross-bracing (68), thereby pivoting locking ladder (62) into the unlocked configuration as shown in FIG. 7B. With locking ladder (62) in the unlocked configuration, the technician may lower tabletop assembly (30) in accordance with the description herein such that rod (22) and sliding blocks (20) actuate toward yoke (66), as shown between FIGS. 7B-7C. Once the technician has lowered tabletop assembly (30) to the desired height, the technician may release air lock switch (86) such that air lock valve assembly (98) returns to the normally closed position. With air lock valve assembly (98) in the normally closed position, compressed air may no longer suitably reach air cylinder (70) in accordance with the description herein. Therefore, the weight of locking ladder (62) may drive actuator (72) back toward cylinder (70) such that locking ladder (62) returns to the locked configuration, as shown in FIG. 7D. With locking ladder (62) in the locked configuration, tabletop assembly (30) is once again inhibited from incidentally lowering further via engagement between locking teeth (64) and rod (22).

IV. Illustrative Wheel Assembly

In previous lift tables, only two castor wheels have been incorporated. In some instances, it may be desirable to provide a greater degree of control of a lift table such that a technician may more easily position lift table into a desired position. As mentioned above, lift table (10) includes four lockable swivel castor wheels (50). As will be described in greater detail below, use of four lockable swivel castor wheels (50) provides a greater degree of control of lift table (10) compared to previous lift tables.

Figure 8:
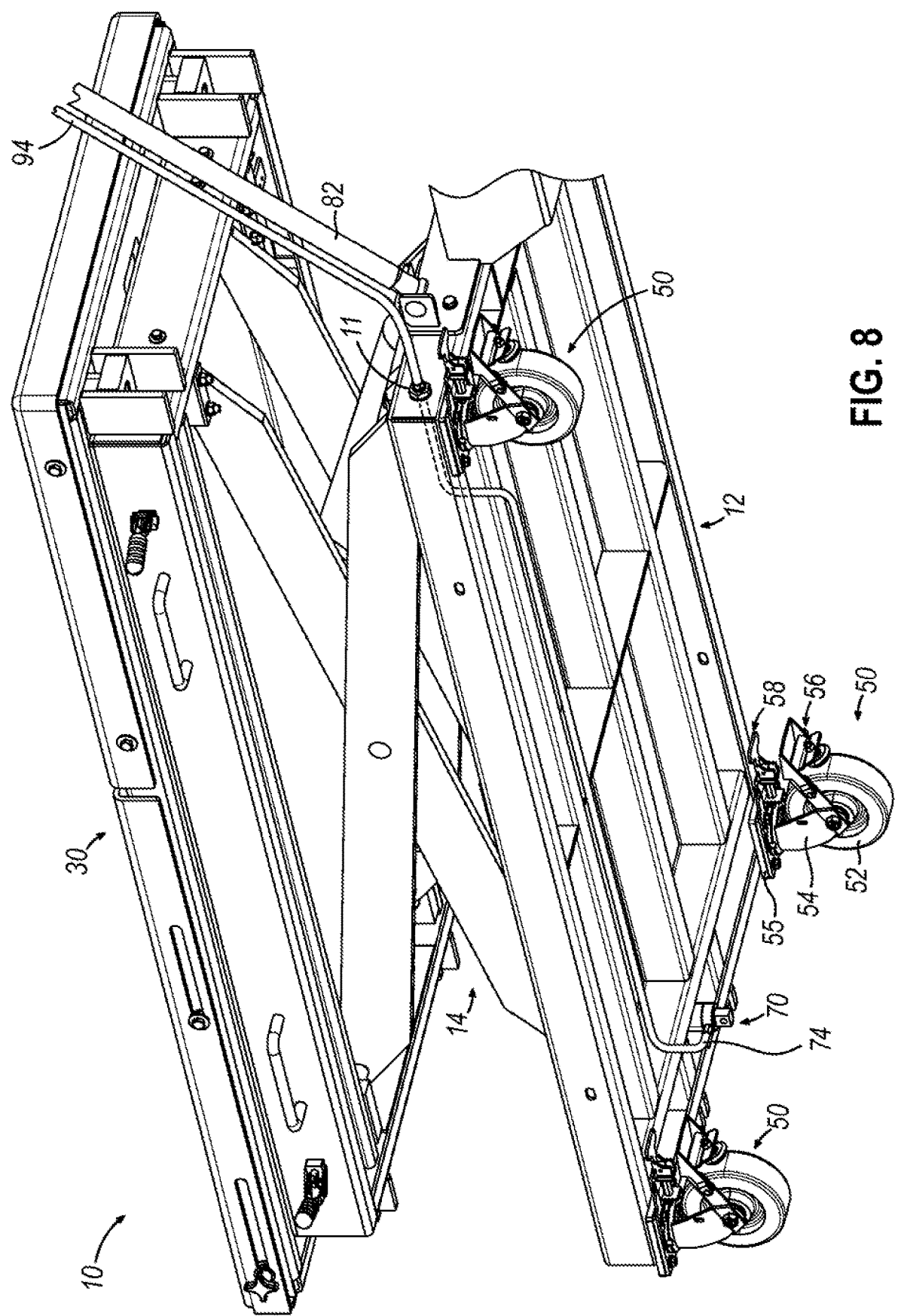
FIG. 8 is another perspective view of the underside of the lower portion of FIG. 3.

As best shown in FIG. 8, each lockable swivel castor wheel (50) includes a wheel (52), a swivel castor yoke (54), a swivel castor base (55), a wheel brake assembly (56), and a swivel lock assembly (58). Swivel castor yokes (54) are suitably coupled with wheels (52) such that wheels (52) may roll on a shop floor. Swivel castor base (55) is fixed to the underside of base (12). Additionally, swivel castor yoke (54) and wheel (52) may rotate around the long axis of castor yoke (54) relative to swivel castor base (55), thereby allowing wheel (52) to position itself such that table (10) may be moved on the shop floor in any suitably direction. Additionally, wheel brake assembly (56) may selectively prevent a respective wheel (52) from rolling on the shop floor, while swivel lock assembly (58) may selectively prevent wheel (52) and respective yoke (54) from rotating relative to swivel castor base (55). Therefore, having four lockable swivel castor wheels (50) provided on lift (10) may provide for additional control of moving lift table (10) on the shop floor.

V. Illustrative Tilt Adjustment Assembly

Previous lift tables may have allowed for tilting of the top surface configured to directly engage an object to be lifted by the lift table. However, such tilting assemblies have only been configured to tilt the top surface of the lift table while such a lift table is not supporting a heavy object. Therefore, in instances where a heavy object is lifted, such as a fuel unit for a vehicle, it is not possible to then adjust the tilt position of the lift table in order to suitably position fuel unit relive to vehicle for mounting purposes. In such instances, a technician may then have to remove the fuel unit, make the necessary tilt adjustments, reload the fuel unit onto the lifting table, and then position the fuel unit adjacent to the mounting areas of the vehicle. This may consume an undesirable amount of time. Therefore, it may be desirable to have a lift table configured to adjust the tilt position while supporting a heavy object, such as a fuel unit for an EV.

As mentioned above, and as best shown in FIGS. 9A-9B, lift table (10) includes a pair of tilt adjustment assemblies (100) configured to pivot adjustable top assembly (34) relative to scissor lift engagement base (32) about pivot axis (A1) into various tilt angles. As will be described in greater detail below, tilt adjustment assemblies (100) are configured to adjust the tilt position of adjustable top assembly (34) while lift (10) supports a heavy load, such as a fuel unit.

Each tilt adjustment assembly (100) includes a pair of flanges (102), a threaded nut (104) interposed between flanges (102), a jack screw (106) threadably coupled with threaded nut (104), and a receptacle (114) associated with the underside of central plate (40) of adjustable top assembly (34). Flanges (102) are fixed to scissor lift engagement base (32) and are located on opposite ends of base (32) compared to where adjustable top assembly (34) is pivotally connected to scissor lift engagement base (32) (see FIG. 2). Threaded nut (104) defines a female-threaded through hole (105), while jack screw (106) includes a threaded rod (108) that meshes with threaded through hole (105). Threaded nut (104) is fixed relative to flanges (102) such that threaded nut (104) may not rotate or translate relative to flanges (102). Jack screw (106) also includes an engagement surface (10) that suitably engages receptacle (114) associated with central plate (40). Receptacle (114) may ensure jack screw (106) remains suitably engaged with the underside of central plate (40).

Jack screw (106) also includes a torque engagement feature (112), which in the current aspect of the disclosure includes a recessed opening dimensioned to receive a suitable wrench, such as an impact wrench. However, torque engagement features (112) may include any suitable feature as would be apparent to one skilled in the art in view of the teachings herein.

Figure 9A:
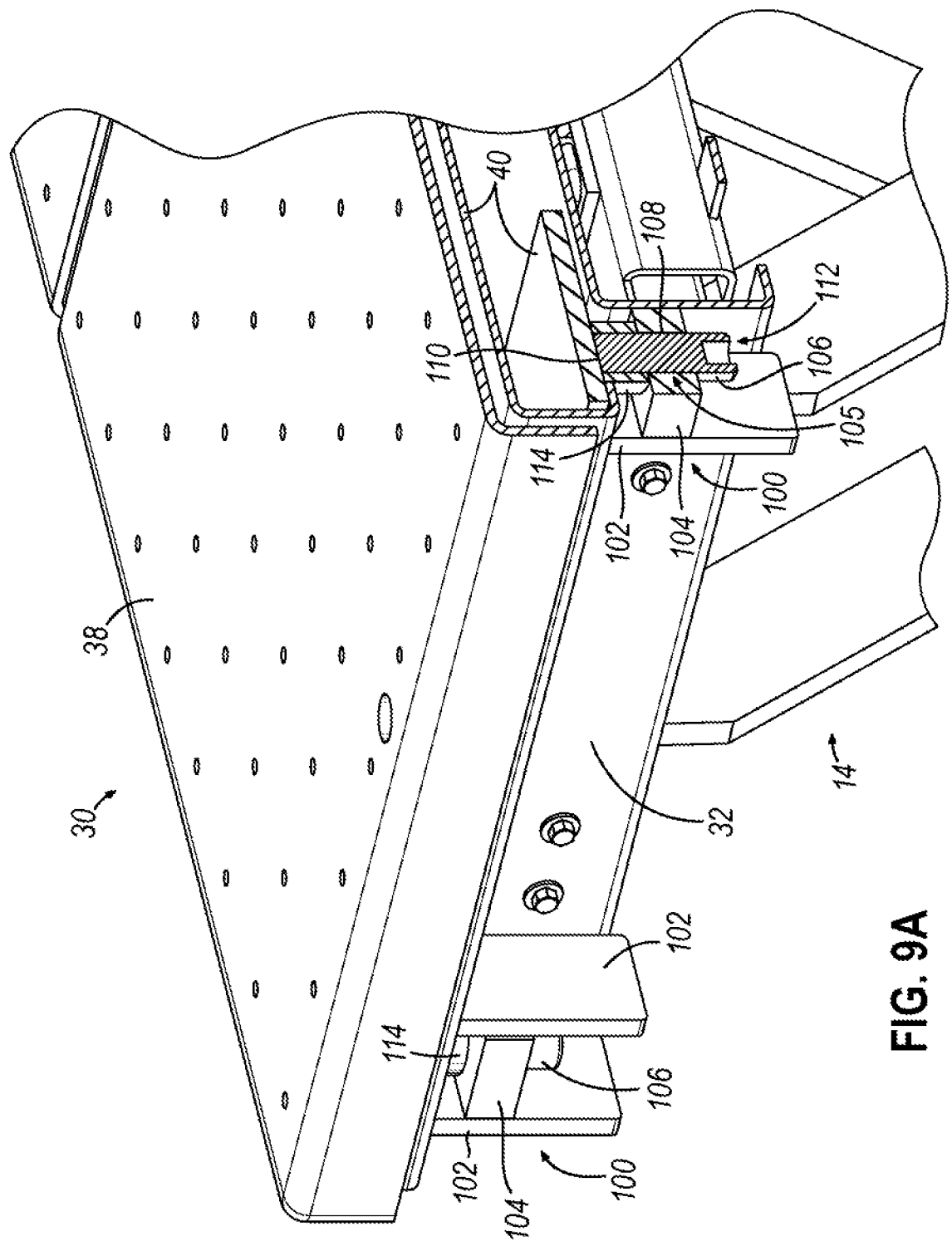
FIG. 9A is a sectional view of the tabletop assembly of FIG. 1B, taken along line 9A-9A of FIG. 1C.
Figure 9B:
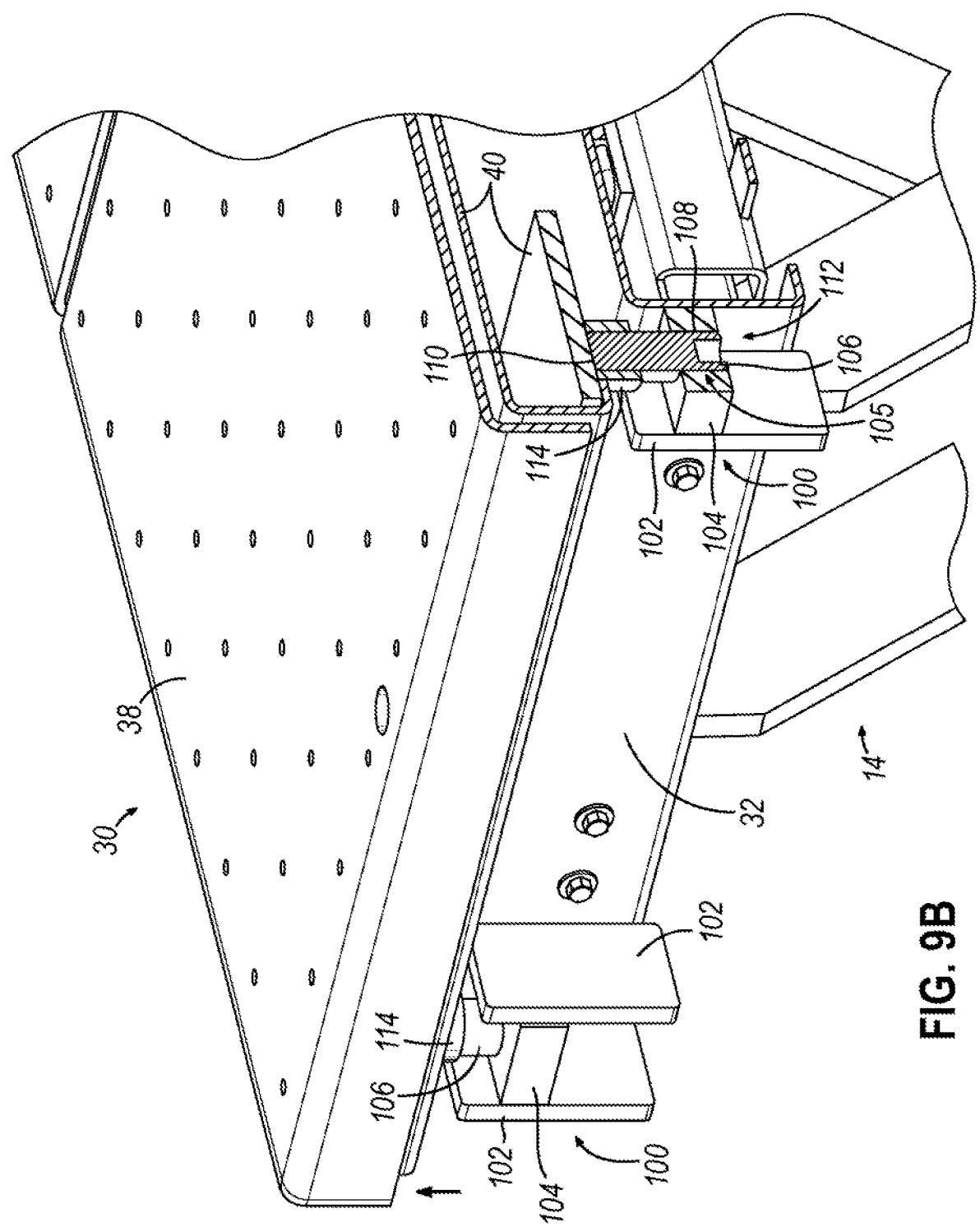
FIG. 9B is a sectional view of the tabletop assembly of FIG. 1B, taken along line 9B-9B of FIG. 1D.

As shown between FIGS. 9A-9B, when a technician desires to adjust the tilt angle of adjustable top assembly (34), the technician may rotate jack screws (106) relative to nut (104) via suitable engagement with torque engagement feature (112). Since nut (104) is fixed relative to flanges (102), and since threaded rod (108) of jack screw (106) meshes with threaded through hole (105) of nut (104), rotation of jack screw (106) causes jack screw (106) to vertically actuate relative to nut (104). In particular, a technician may rotate jack screws (106) in a first rotational direction to actuate jack screws (106) upward; while a technician may rotate jack screw (106) in a second, opposite rotational direction to actuate jack screws (106) downward. As best shown in FIG. 9B, upward movement of jack screws (106) causes adjustable top assembly (34) to pivot upwards, thereby increasing the tilt angle of adjustable top assembly (34). Conversely, downward movement of jack screws (106) causes adjustable top assembly (34) to pivot downward, thereby decreasing the tile angle of adjustable top assembly (34).

Since jack screws (106) include a torque engagement feature (112), a technician may apply a greater degree of torque to jack screws (106) than if jack screws (106) were rotatable by hand. Therefore, a technician may adjust the tilt of adjustable top assembly (34) while tabletop assembly (30) is supporting a heavy object, such as a fuel unit for an EV.

VI. Illustrative Shiftable Tabletop Assembly

Previous lift tables may have included a locking assembly configured to selectively fix the position of tabletop assembly (30) when in a locked configuration and allow tabletop assembly (30) to shift (e.g., translate/rotate) along a lateral plane (e.g., a plane parallel to the floor) relative to the rest of lift table (10) when in an unlocked configuration. Therefore, if a user desired to shift tabletop assembly (30) along such a lateral plane, a user could actuate the locking assembly into the unlocked configuration, then manually push/pull tabletop assembly (30) (for example, by grasping handlebars on top assembly (34)), thereby shifting tabletop assembly (30) relative to the rest of lift table (10) along a lateral plane into the desired position. With tabletop assembly (30) shifted into the desired position relative to the rest of lift table (10), the user could then actuate locking assembly into the locked configuration, thereby fixing tabletop assembly (30) in the newly achieved position relative to the rest of lift table (10).

In some instances, manually pushing/pulling tabletop assembly (30) may not be sufficient to precisely shift tabletop assembly (30) in the lateral plane into a desired position relative to the rest of lift table (10) or, in some cases, even actuate tabletop assembly (30) along the lateral plane relative to the rest of lift table (10) at all. As mentioned above, in instances where a lift table is supporting a heavy object, such as a fuel unit for a vehicle, it may be desirable to adjust the position of the fuel unit. For example, a lift table may be supporting a fuel unit to be mounted to the underside of lifted electric vehicle. However, the mounting features of the fuel unit may be slightly misaligned relative to the mounting features of the electric vehicle such that the fuel unit requires precise shifting. In such instances, manually pushing/pulling the portion of lift table supporting the fuel unit in order to shift the tabletop of lift table (10) along a lateral plane may not be suitable, as technician may lack the required strength to overcome the weight of fuel unit to precisely adjust the fuel unit. Additionally, it may be difficult for a technician to adjust the position of the entire lift table (e.g., rolling the lift table (10) on castor wheels) with the desired precision to suitably position the fuel unit relative to the mounting features of the electric vehicle. Therefore, it may be desirable to have a lift table with an adjustable tabletop configured to precisely shift along a lateral plane relative to the rest of the lift table, even while supporting a heavy object (e.g., a fuel unit).

Figure 10:
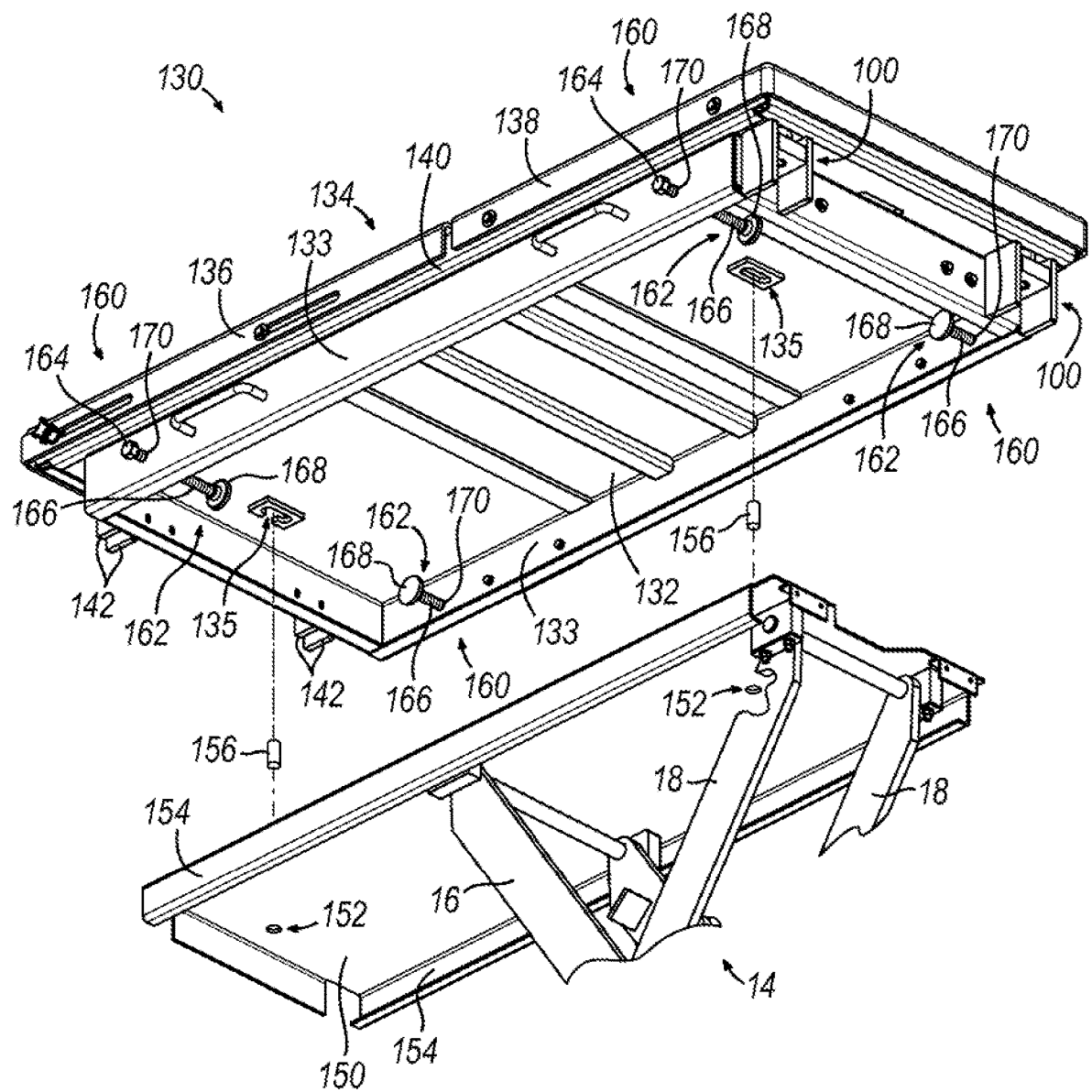
FIG. 10 is a perspective exploded view of selected portion of an alternative lift table, including an alternative tabletop assembly, a scissor lift assembly, an intermediate frame interposed between the tabletop assembly and the scissor lift assembly, and four tabletop shifting assemblies.

FIG. 10 shows an alternative tabletop assembly (130) that may be readily incorporated into lift table (10) in replacement of tabletop assembly (30) described above. Therefore, tabletop assembly (130) is substantially similar to tabletop assembly (30), with differences elaborated below. Tabletop assembly (130) includes a table base (132), an adjustable top assembly (134), and an intermediate frame (150). As will be described in greater detail below, tabletop assembly (130) includes a plurality of tabletop shifting assemblies (160) configured to reposition table base (132) and adjustable top assembly (134) relative to intermediate frame (150) (and other suitable components of lift table (10)) along a lateral plane (which may be substantially parallel to the shop floor). As will also be described in greater detail below, tabletop shifting assemblies (160) are configured to enable repositioning of table base (132) and adjustable top assembly (134) while supporting a heavy object, such as a fuel unit for an electric vehicle.

Table base (132) and adjustable top assembly (134) are substantially similar to scissor lift engagement base (32) and adjustable top assembly (34) described above, with differences elaborated below. Therefore, adjustable top assembly (134) includes a first end plate (136), a second end plate (138), and a central plate (140), which may be substantially similar to first end plate (36), second end plate (38), and central plate (40) described above, respectively, with differences elaborated below. The overall length of adjustable top assembly (134) may be adjusted.

Similar to how base (32) and adjustable top assembly (34) pivot relative to each other about axis (A1) as described above, table base (132) and adjustable top assembly (134) are pivotally coupled to each other via yokes (142) and flanges (144), which are substantially similar to yokes (42) and flanges (44) described above. Additionally, tabletop assembly (130) includes tilt adjustment assemblies (100), which are configured to adjust the tilt angle of adjustable top assembly (134) relative to table base (132) in substantially the same manner as base (32) and adjustable top assembly (34) described above.

Intermediate frame (150) is interposed between the rest of tabletop assembly (130) and scissor lift assembly (14). Intermediate frame (150) is operatively engaged with scissor lift assembly (14) such that vertical actuation of scissor lift assembly (14) vertically actuates intermediate frame (150), table base (132), and top assembly (134). Intermediate frame (150) may be engaged with scissor lift assembly (14) such that ends of legs (18) are substantially fixed to intermediate frame (150), and ends of legs (16) are slidably attached to intermediate frame (150). Therefore, intermediate frame (150) may be attached to scissor lift assembly (14) such that legs (16) may longitudinally actuate along a preterminal path relative to intermediate frame (150), but such that intermediate frame (150) does not laterally shift relative to ends of either pair of legs (16, 18). While not shown in FIG. 10, it should be understood that scissor lift assembly (14) is operatively coupled to other suitable components of lift table (10) as described above. Therefore, it should be understood that tabletop assembly (130) may be suitably attached to lift table (10) in replacement tabletop assembly (30) described above.

An underside of table base (132) may rest on a top surface of intermediate frame (150). The top surface of intermediate frame (150) defines two pin holes (152), while the underside of table base (132) defines two recessed pin housings (135). Respective pin holes (152) and recessed pin housings (135) are dimensioned to house a common pin (156). Recessed pin housings (135) are dimensioned to slidably house pins (156) such that table base (132) and adjustable tabletop assembly (134) may slide together relative to intermediate frame (150) while pins (156) are still housed within a respective recessed pin housing (135). Therefore, table base (132) and tabletop assembly (134) may be repositioned relative to intermediate frame (150), yet be at least partially inhibited from actuating too far relative to intermediate frame (150) via pins (156) and recessed housings (135). In some instances, pins (156) may include a collar configured to rest on the top surface of intermediate frame (150) such that pins (156) do not slide though pin hole (152).

Intermediate frame (150) also includes a pair of engagement surfaces (154) located on opposite lateral sides of intermediate frame (150). As will be described in greater detail below, engagement surfaces (154) are configured to abut against suitable components of tabletop shifting assembles (160) to enable table base (132) and top assembly (134) to be shifted relative to intermediate frame (150) and the rest of lift table (10).

As mentioned above, tabletop assembly (130) includes a plurality of tabletop shifting assemblies (160) configured to reposition table base (132) and adjustable top assembly (134) relative to intermediate frame (150) even when tabletop assembly (130) is supporting a heavy object, such as a fuel unit for an electric vehicle. Such shifting of tabletop assembly (130) may allow a technician to make fine adjustments to position a fuel unit to align respective mounting features of the fuel unit and the electric vehicle. Each tabletop shifting assembly (160) in this example includes a leadscrew (162) having a torque receiving member (164), a threaded stud (166), and a frame engagement feature (168).

Torque receiving member (164) extends laterally away from a respective side surface (133) of table base (132). Torque receiving member (164) is configured to mate with a suitable torque generating tool to thereby rotate leadscrew (162) about its own long axis. For example, torque receiving member (164) may be configured to mate with a torque generating tool, such as a wrench, a socket wrench, a pneumatic wrench, etc. The use of a torque generating tool in conjunction with torque receiving member (164) allows a user to generate a large amount of torque on leadscrew (162) for purposes of shifting tabletop assembly (130) in accordance with the description herein. In some instances, torque receiving member (164) may have a torque generating tool integrally attached to torque receiving member (164). For example, in some instances, torque receiving member (164) may have a lever integrally attached thereto. Torque receiving member (164) in the current example is in the form of a bolt head. However, any torque receiving member (164) may include any other suitable features as would be apparent to one skilled in the art in view of the teachings herein.

Threaded stud (166) extends between torque receiving member (164) and frame engagement feature (168) such that a first portion of threaded stud (166) extends laterally outward from its respective side surface (133), while a second portion of threaded stud (166) extends laterally inward from its respective side surface (133). Threaded stud (166) is threadably coupled to a complementary threaded through hole (170) defined by a side surface (133) of table base (132). In some instances, complementary threading of threaded through hole (170) may be provided by a nut that is fixed to side surface (133) of table base (132) or any other suitable structure as would be apparent to one skilled in the art in view of the teachings herein. Engagement between threaded stud (166) and respective threaded through hole (170) allows rotation of leadscrew (162) in a first rotation direction to drive translation of leadscrew (162) laterally inward relative to a respective side surface (133), while rotation of leadscrew (162) in a second, opposite rotational direction drives translation of leadscrew (162) laterally outward relative to a respective side surface (133). It should be understood that such rotation of leadscrew (162) may be generated by torque imparted on torque receiving member (164).

Frame engagement feature (168) is configured to suitably abut against a respective engagement surface (154) of intermediate frame (154). As will be described in greater detail below, frame engagement features (168) are configured to drive table base (132) and top assembly (134) relative to intermediate frame (150) in response to rotation of threaded stud (166) in accordance with the description herein, thereby shifting table base (132) and top assembly (134) relative to intermediate frame (150) and allowing precise placement of heavy objects supported by top assembly (134). Additionally, multiple frame engagement features (168) are configured to cooperatively lock table base (132) and top assembly (134) relative to intermediate frame (150) before or after shifting of table base (132) and top assembly (134) in accordance with the description herein. In the current example, frame engagement feature (168) includes a plastic standoff. However, any suitable structures and/or materials may be used for frame engagement feature (168) as would be apparent to one skilled in the art in view of the teachings herein.

Figure 11A:
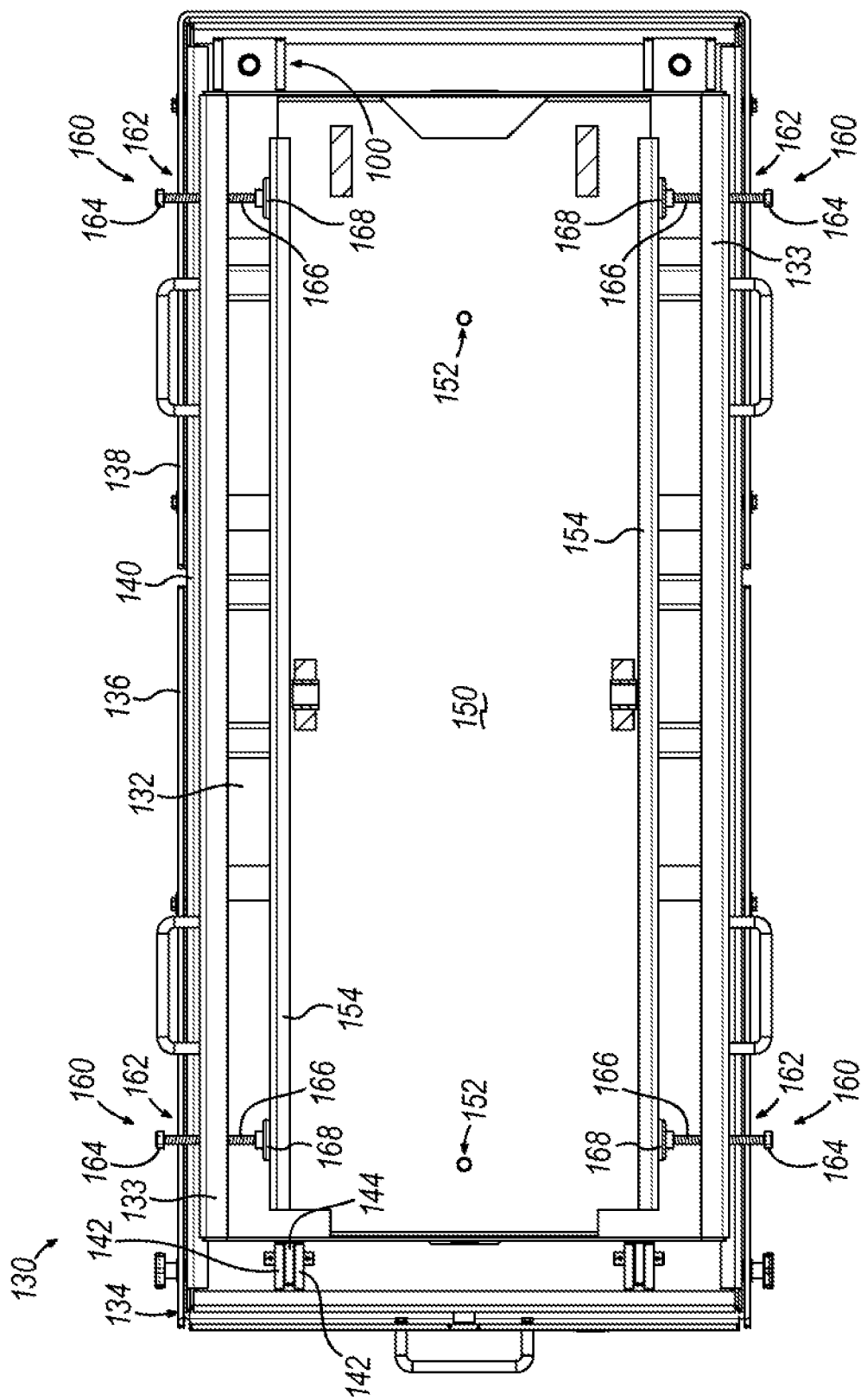
FIG. 11A is a bottom plan view of the tabletop assembly and the intermediate frame of FIG. 10, with each of the four tabletop shifting assemblies of FIG. 10 engaged with the intermediate frame while the tabletop assembly in a first position.
Figure 11B:
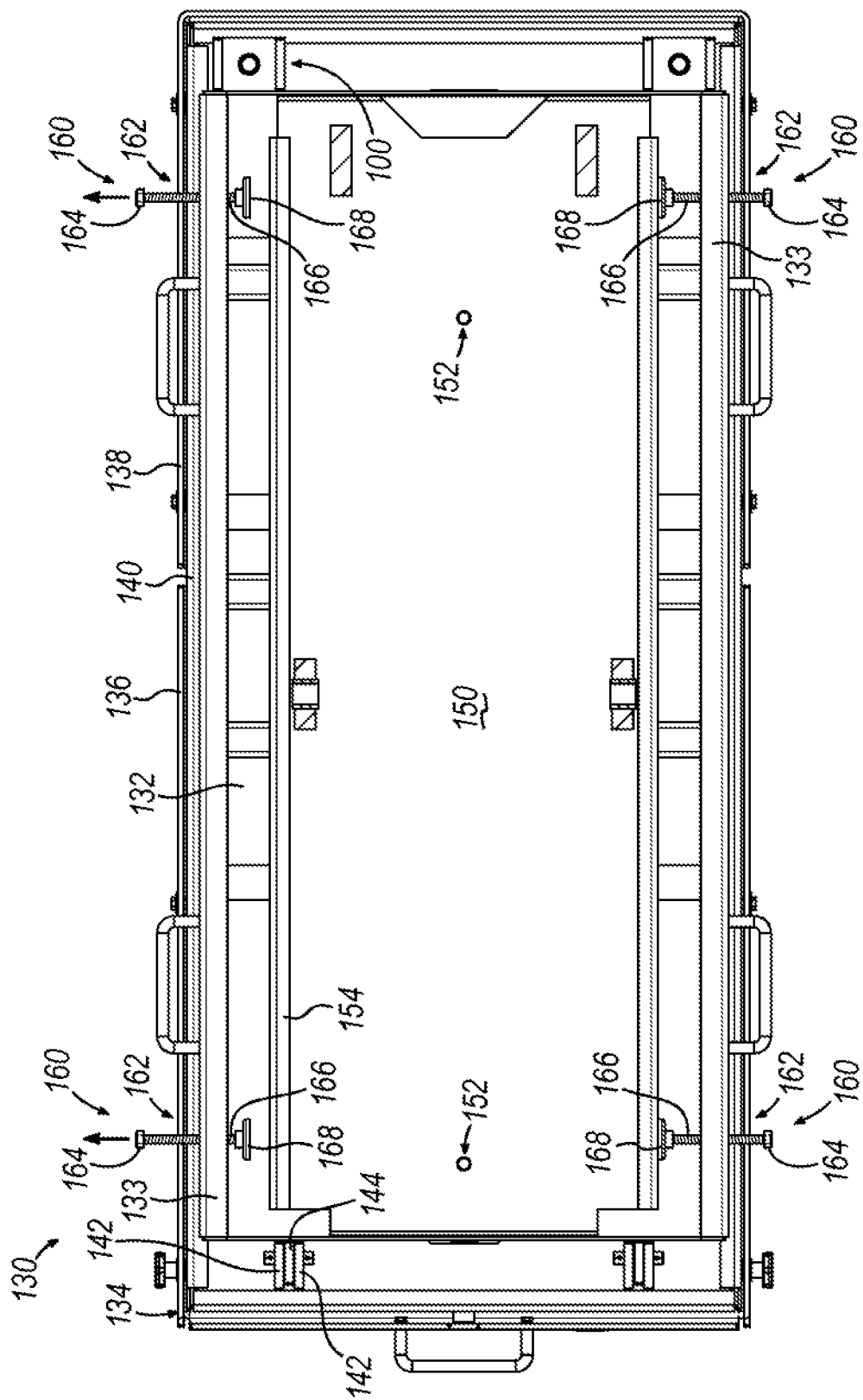
FIG. 11B is a bottom plan view of the tabletop assembly and the intermediate frame of FIG. 10, with two tabletop shifting assemblies of FIG. 10 disengaged with the intermediate frame while the tabletop assembly is in the first position.
Figure 11C:
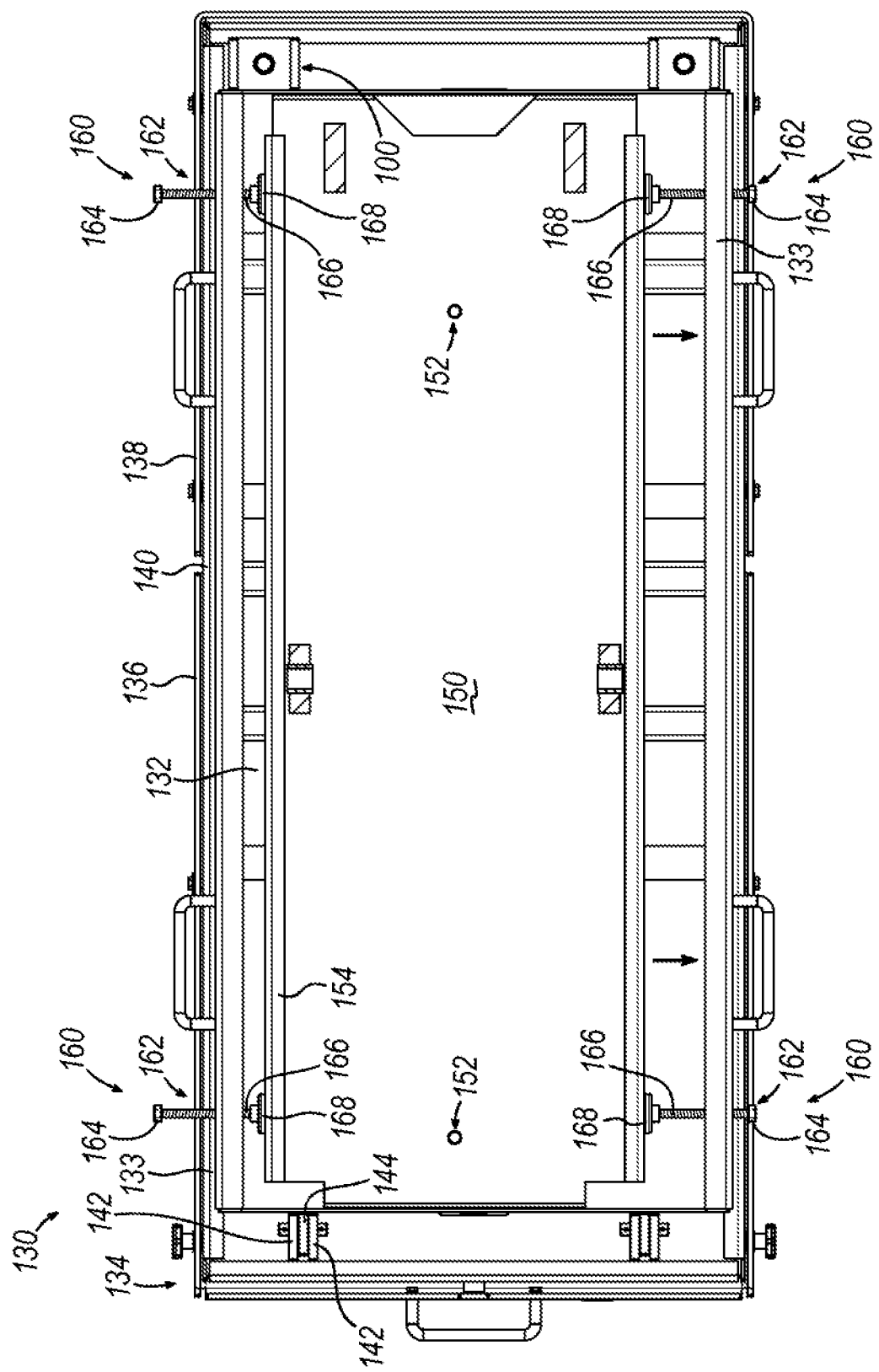
FIG. 11C is a bottom plan view of the tabletop assembly and the intermediate frame of FIG. 10, with each of the four tabletop shifting assemblies of FIG. 10 engaged with the intermediate frame while the tabletop assembly is shifted into a second position.

FIGS. 11A-11C show an illustrative use of tabletop shifting assemblies (160) in order to laterally translate table base (132) and top assembly (134) relative to intermediate frame (150). First, as shown in FIG. 11A, each frame engagement feature (168) is engaged with a respective side surface (154) of intermediate frame (150). At the moment shown in FIG. 11A, table base (132) and top assembly (134) are locked relative to intermediate frame (150).

As mentioned above, in some instances, a technician may desire to precisely shift top assembly (134) relative to intermediate frame (150) in order to suitably position a supported object (such as aligning the supported object with suitable mounting features). In such instances, the technician may rotate two leadscrews (162) in the first angular direction in accordance with the description herein such that their respective frame engagement features (168) are no longer engaged with their respective side surfaces (154), as shown in FIG. 11B. In the current example, the two leadscrews (162) are associated with the same side surface (154) (e.g., the top side surface when viewed from the top of the page) of intermediate frame (150).

Next, as shown in FIG. 11C, the technician may rotate the opposite two leadscrews (162) in the second, opposite, angular direction in accordance with the description herein such that their respective frame engagement feature (168) pushes their side surface (133) of table base (132) away from its respective side surface (155) of intermediate frame (150), thereby shifting table base (132) and top assembly (134) into the desired position relative to intermediate frame (150) and the rest of the lift table (10). The use of a torque generating tool in conjunction with torque receiving member (164) allows a user to generate a large amount of torque on leadscrew (162), thereby allowing a user to shift table base (132) and top assembly (134) while supporting a heavy object.

It should be understood that the technician may shift table base (132) and top assembly (134) until frame engagement members (168) that were originally disengaged with their respective side surface (154) are reengaged with side surface (154) as shown in FIG. 11C. In such instances, table base (132) and top assembly (134) are returned to being locked relative to intermediate frame (150). In some instances, base (130) and top assembly (134) may shift into their desired position prior to all four frame engagement members (168) reaching engagement with their respective side surface (154), such that base and top assembly (134) remains in the unlocked configuration. If desired, a technician may then rotate the two leadscrews (162) not engaged with their respective side surface (150) such that their respective frame engagement member (168) is suitably engaged with their respective side surface.

Figure 12A:
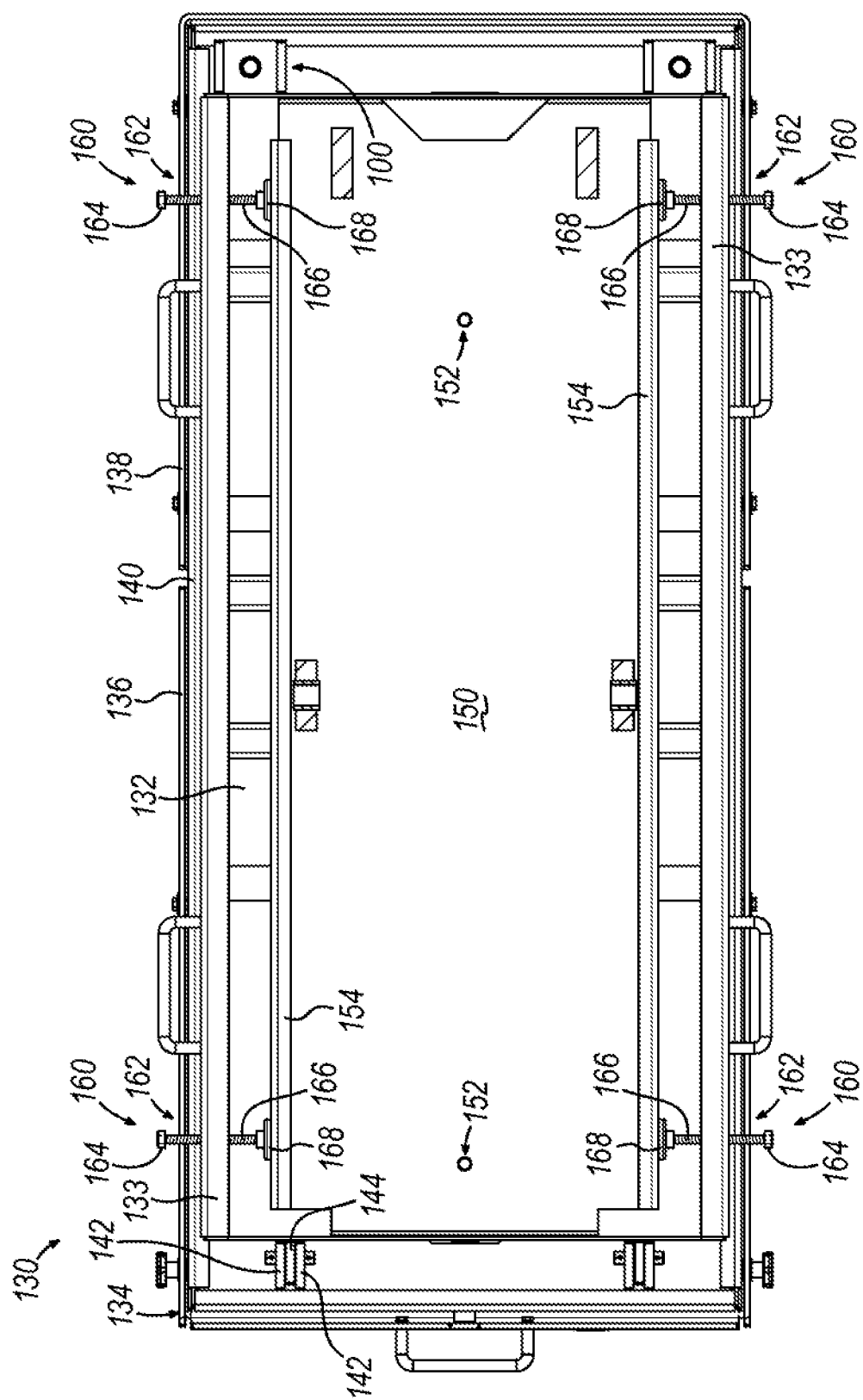
FIG. 12A is a bottom plan view of the tabletop assembly and the intermediate frame of FIG. 10, with each of the four tabletop shifting assemblies of FIG. 10 engaged with the intermediate frame while the tabletop assembly in the first position.
Figure 12B:
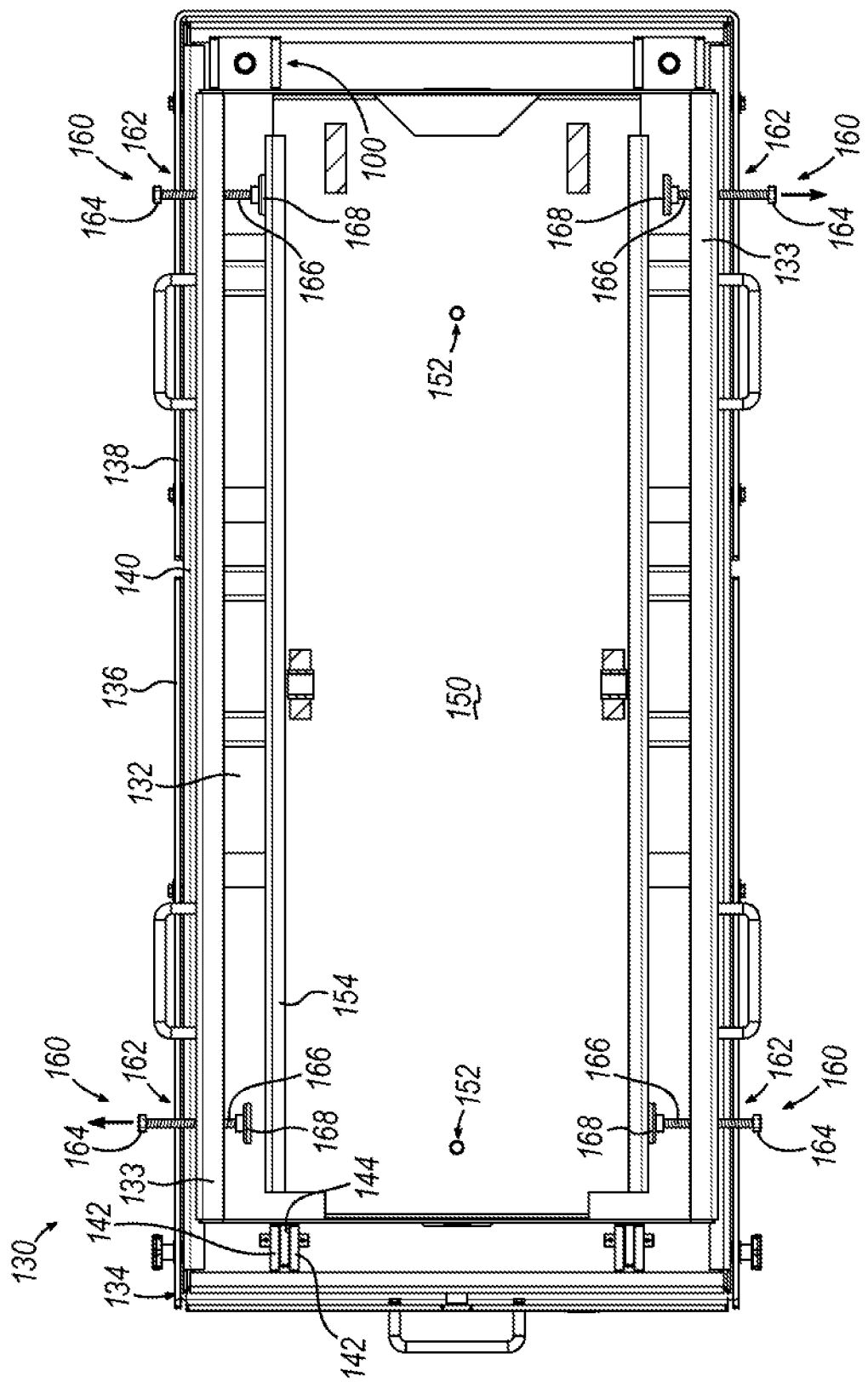
FIG. 12B is a bottom plan view of the tabletop assembly and the intermediate frame of FIG. 10, with two tabletop shifting assemblies of FIG. 10 disengaged with the intermediate frame while the tabletop assembly is in the first position.
Figure 12C:
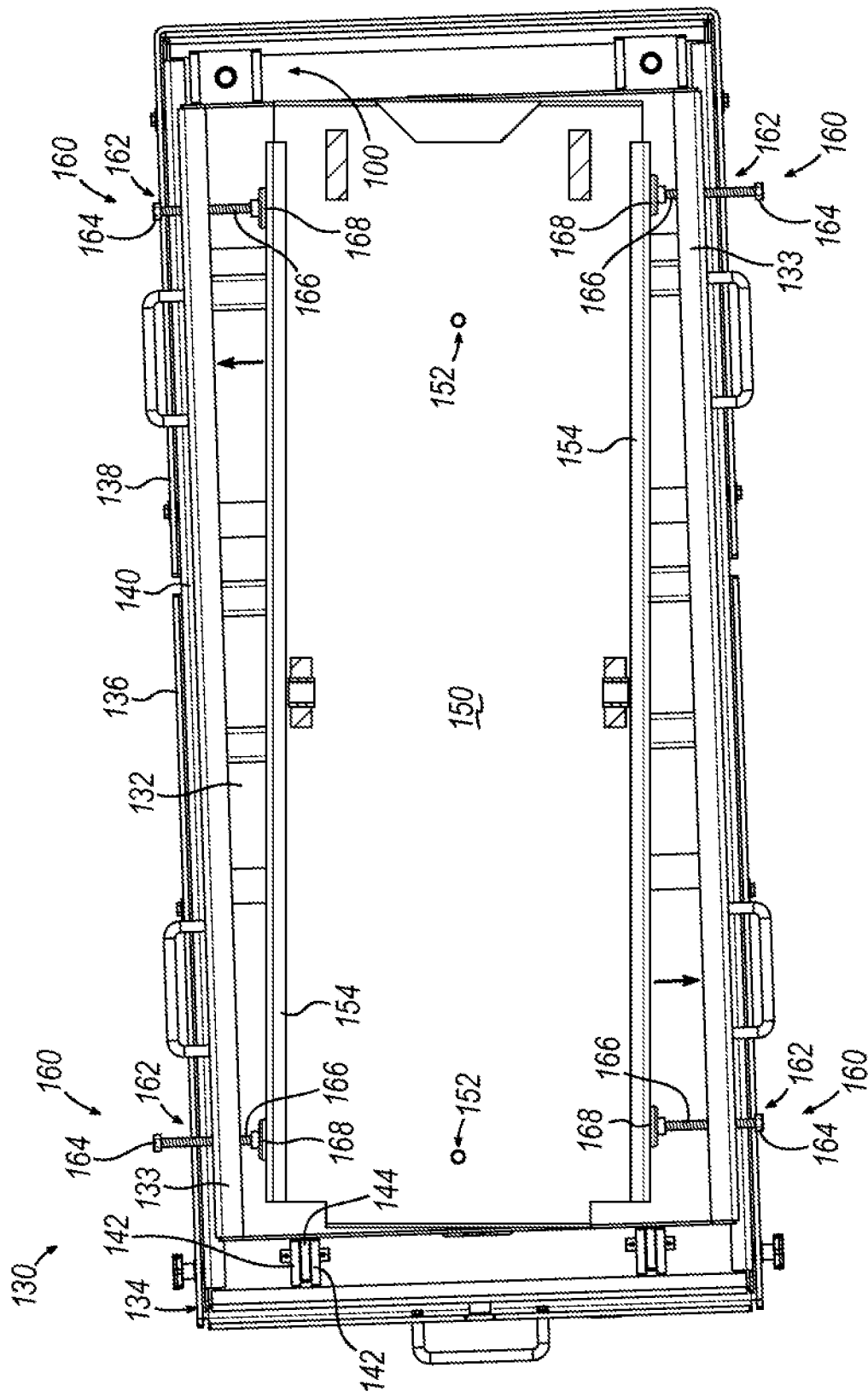
FIG. 12C is a bottom plan view of the tabletop assembly and the intermediate frame of FIG. 10, with each of the four tabletop shifting assemblies of FIG. 10 engaged with the intermediate frame while the tabletop assembly is shifted into a third position.

FIGS. 12A-12C show an illustrative use of tabletop shifting assemblies (160) in order to rotate table base (132) and top assembly (134) relative to intermediate frame (150). First, as shown in FIG. 12A, each frame engagement feature (168) is engaged with a respective side surface (154) of intermediate frame (150). At the moment shown in FIG. 12A, table base (132) and top assembly (134) are locked relative to intermediate frame (150).

If the technician desires to precisely shift top assembly (134) relative to intermediate frame (150) in order to suitably position a supported object, the technician may rotate two leadscrews (162) in the first angular direction in accordance with the description herein such that their respective frame engagement features (168) are no longer engaged with their respective side surfaces (154), as shown in FIG. 12B. In the current example, the two leadscrews (162) are associated with the opposite side surfaces (154) at opposite longitudinal ends relative to each other.

Next, as shown in FIG. 12C, the technician may rotate the remaining two leadscrews (162) in the second, opposite, angular direction in accordance with the description herein such that each respective frame engagement feature (168) pushes the side surface (133) of table base (132) away from its respective side surface (155) of intermediate frame (150), thereby shifting table base (132) and top assembly (134) into the desired position relative to intermediate frame (150) and the rest of the lift table (10). The use of a torque generating tool in conjunction with torque receiving member (164) allows a user to generate a large amount of torque on leadscrew (162), thereby allowing a user to shift table base (132) and top assembly (134) even while it supports a heavy object.

It should be understood that the technician may shift table base (132) and top assembly (134) until frame engagement members (168) that were originally disengaged from their respective side surface (154) are reengaged with side surface (154) as shown in FIG. 12C. In such instances, table base (132) and top assembly (134) are returned to being locked relative to intermediate frame (150). In some instances, base (130) and top assembly (134) may shift into their desired position before all four frame engagement members (168) reach engagement with their respective side surface (154), such that base and top assembly (134) remains in the unlocked configuration. If desired, a technician may then rotate the two leadscrews (162) not engaged with their respective side surface (150) such that their respective frame engagement member (168) is suitably engaged with their respective side surface.

Figure 13A:
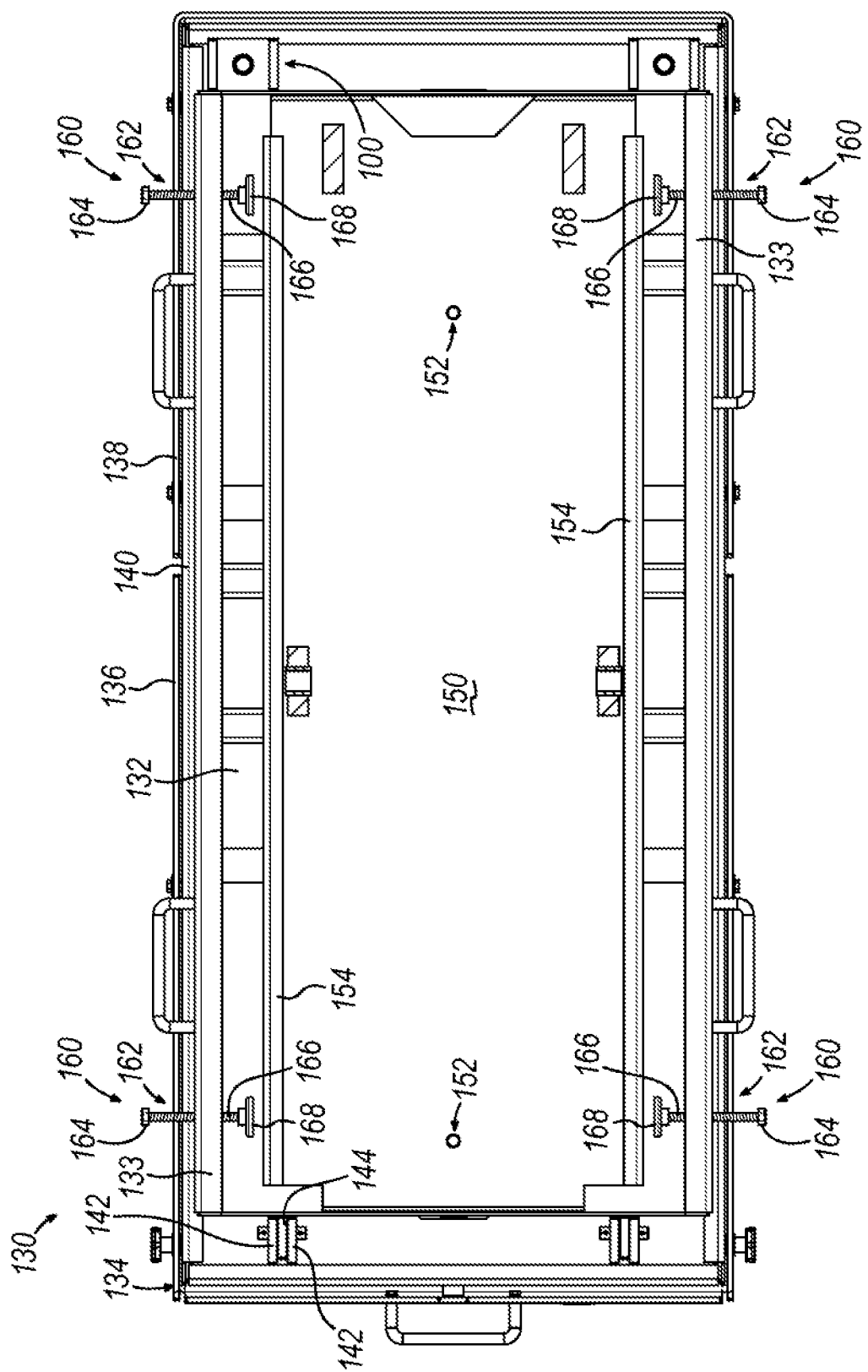
FIG. 13A is a bottom plan view of the tabletop assembly and the intermediate frame of FIG. 10, with each of the four tabletop shifting assemblies of FIG. 10 disengaged with the intermediate frame while the tabletop assembly in the first position.
Figure 13B:
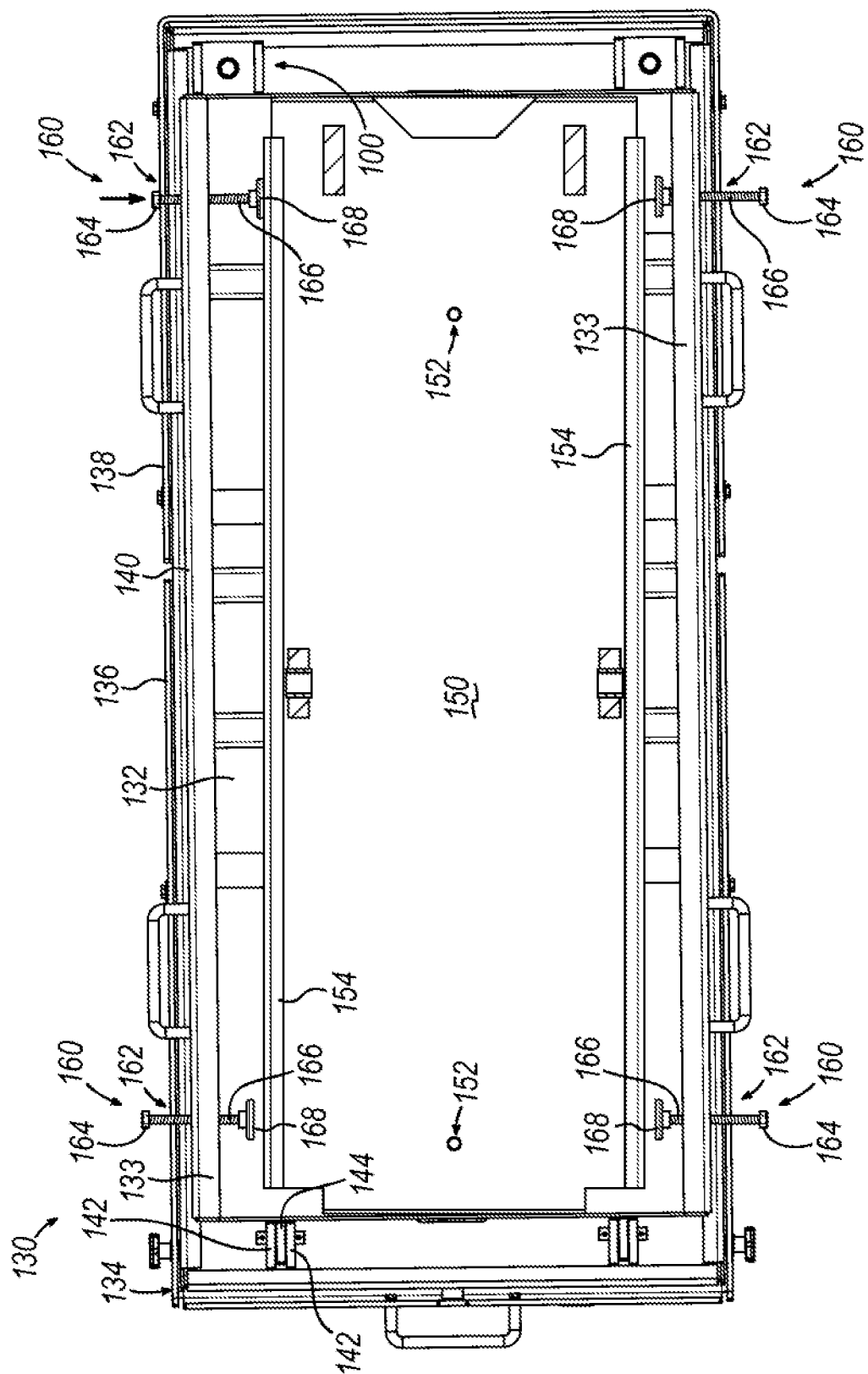
FIG. 13B is a bottom plan view of the tabletop assembly and the intermediate frame of FIG. 10, with one tabletop shifting assemblies of FIG. 10 engaged with the intermediate frame while the tabletop assembly is shifted into a third position.
Figure 13C:
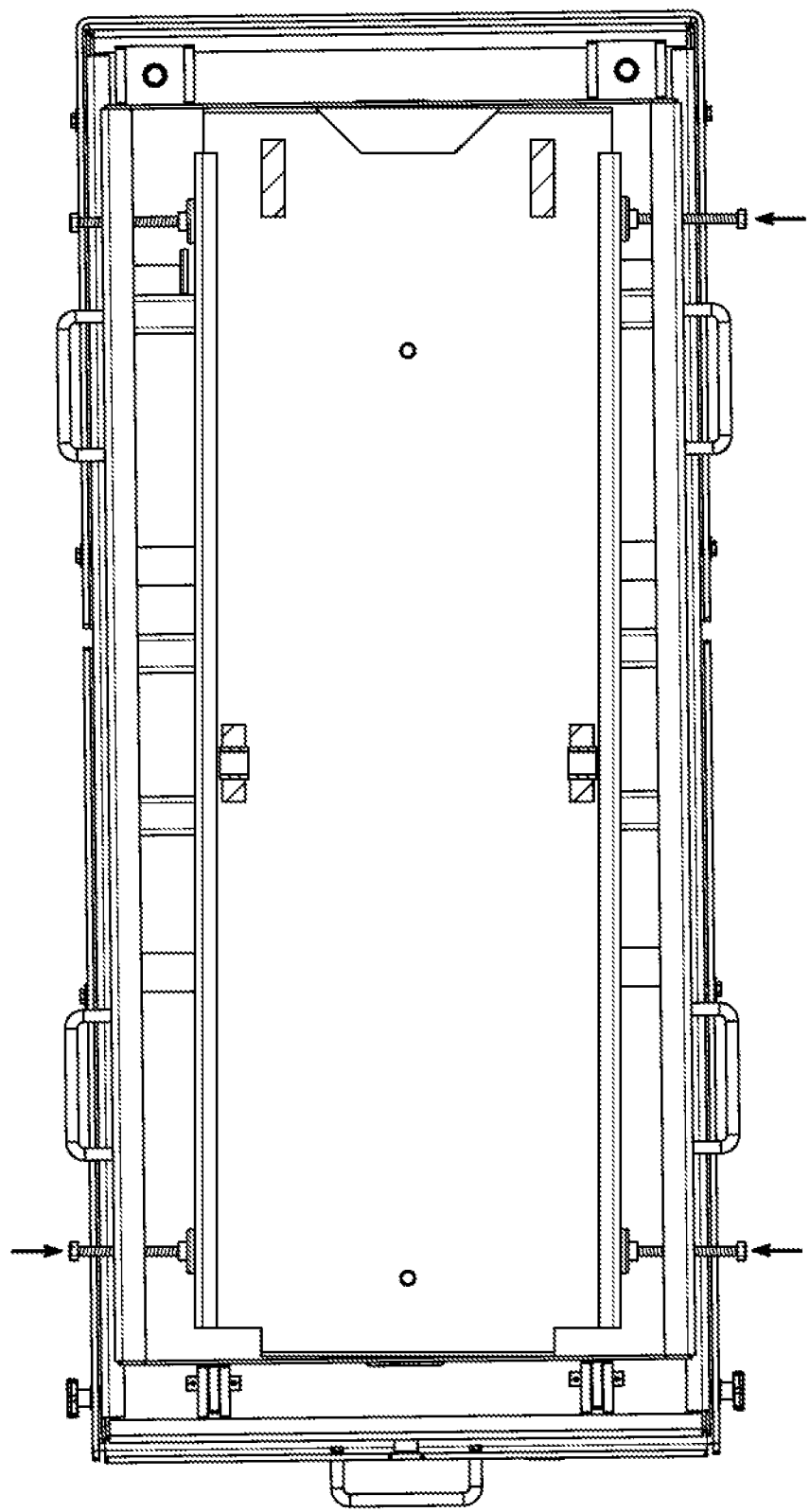
FIG. 13C is a bottom plan view of the tabletop assembly and the intermediate frame of FIG. 10, with each of the four tabletop shifting assemblies of FIG. 10 engaged with the intermediate frame while the tabletop assembly is in the third position.

FIGS. 13A-13C show another illustrative use of tabletop shifting assemblies (160) in order to shift table base (132) and top assembly (134) relative to intermediate frame (150). First, as shown in FIG. 13A, each frame engagement member (168) may be disengaged from the respective side surface (152) of intermediate frame (150). A technician may actuate respective lead screws (162) into such a position from the locked configuration shown in FIGS. 11A and 12A. Next, as shown in FIG. 13B, the technician may rotate one or more lead screws (162) such that each frame engagement member (168) of the actuated lead screws (162) pushes its respective side surface (152) away from the side surface (133) that the actuated leadscrew (162) is attached to, thereby shifting table base (132) and top assembly (134) relative to intermediate frame (150). The use of a torque generating tool in conjunction with torque receiving member (164) allows a user to generate a large amount of torque on leadscrew (162), thereby allowing a user to shift table base (132) and top assembly (134) while supporting a heavy object.

Once top assembly (134) is suitably positioned, the technician may then actuate the other leadscrews (162) such that their respective frame engagement members (168) are engaged with their respective side surfaces (152), thereby locking top assembly (134) in place relative to intermediate frame (150).

While four tabletop shifting assemblies (160) are used in the current tabletop assembly (130), any suitable number of tabletop shifting assemblies (160) may be incorporated as would be apparent to one skilled in the art in view of the teachings herein. Additionally, while an equal number of tabletop shifting assemblies (160) are shown coupled to each side surface (133), the side surfaces (133) may have different numbers of tabletop shifting assemblies (160).

VII. Illustrative Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A lift table, comprising: (a) a base member; (b) a tabletop; and (c) a lift assembly configured to adjust the height of the tabletop, wherein the lift assembly comprises a hydraulic cylinder assembly actuated by an air powered hydraulic powerpack assembly mounted to the base member; wherein the lift table comprises a handle extending upward from the base member, wherein the handle comprises a coupling port in fluid communication with the air powered hydraulic powerpack assembly.

Example 2

A lift table, comprising: (a) a base member; (b) a tabletop; and (c) a lift assembly configured to adjust the height of the tabletop, wherein the lift assembly comprises four swivel castor wheel assemblies extending from the base member.

Example 3

A lift table, comprising: (a) a base member; (b) a tabletop; and (c) a lift assembly configured to adjust the height of the tabletop, an air actuated lock assembly configured to selectively inhibit the tabletop from lowering toward the base member.

Example 4

A lift table, comprising: (a) a base member; (b) a tabletop; (c) a lift assembly configured to adjust the height of the tabletop; and (d) a table tilt assembly configured to tilt the tabletop relative to the base member, wherein the table tilt assembly comprises a jack screw having an engagement feature configured to be engaged by a wrench in order to adjust the tilt of the tabletop.

Example 5

A lift table, comprising: (a) a base member; (b) an air-powered hydraulic powerpack assembly mounted to the base member; (c) a tabletop; (d) a lift assembly configured to actuate the tabletop relative to the base member between a lowered position and a raised position, wherein the lift assembly comprises a hydraulic cylinder assembly actuated by the air-powered hydraulic powerpack; and (e) a handle extending upward from the base member such that a top portion of the handle is elevated above the air-powered hydraulic powerpack; and (f) an air supply docking station fixed to the top portion of the handle, wherein the air supply docking station is in fluid communication with the air-powered hydraulic powerpack assembly.

Example 6

The lift table of Example 5, further comprising four swivel castor wheel assemblies extending downward from the base member.

Example 7

The lift table of any one or more of Examples 5-6, further comprising an air-actuated lock assembly in fluid communication with the air supply docking station, wherein the air-actuated lock assembly is configured to actuate between a locked configuration and an unlocked configuration, wherein the air-actuated lock assembly is configured to allow the tabletop to actuate toward the lowered position when in the unlocked configuration, wherein the air-actuated lock assembly is configured to inhibit the tabletop from actuating toward the lowered position when in the locked configuration.

Example 8

The lift table of any one or more of Examples 5-7, wherein the air-actuated lock assembly comprises an air cylinder and an actuator.

Example 9

The lift table of any one or more of Examples 5-8, wherein the base member comprises a port, wherein the port is in fluid communication with both the air supply docking station and the air cylinder of the air-actuated lock assembly.

Example 10

The lift table of any one or more of Examples 5-9, wherein the air supply docking station comprise a T-connector in fluid communication with both the air-actuated lock assembly and the air-powered hydraulic powerpack.

Example 11

The lift table of any one or more of Examples 5-10, wherein the air-actuated lock assembly comprises a switch directly attached to the air supply docking station, wherein the switch is configured to actuate the air-actuated locking assembly between the locked configuration and the unlocked configuration.

Example 12

The lift table of any one or more of Examples 5-11, wherein the air-powered hydraulic powerpack comprises a foot pedal configured to control the hydraulic cylinder.

Example 13

The lift table of any one or more of Examples 5-12, wherein the lift assembly further comprises a scissor lift assembly connected to the hydraulic cylinder.

Example 14

A lift table, comprising: (a) a base member; (b) a tabletop assembly, wherein the tabletop assembly comprises a table base and an adjustable top, wherein the adjustable top is configured to pivot about a pivot axis relative to the table base such that the adjustable top is configured to define a plurality of angles relative to the table base; (c) a lift assembly configured to adjust the height of the tabletop assembly relative to the base member between a lowered configuration and a raised configuration; and (d) a table tilt assembly configured to drive the pivoting of the adjustable top relative to the table base between the plurality of angles, wherein the table tilt assembly comprises a jack screw having an engagement feature configured to be engaged by a torque input tool in order to adjust the tilt of the tabletop.

Example 15

The lift table of Example 14, wherein the table tilt assembly comprises a threaded nut fixed to the table base, wherein the jack screw is engaged with the threaded nut.

Example 16

The lift table of any one or more of Examples 14-15, wherein the table tilt assembly further comprises a pair of flanges fixed to the table base, wherein the threaded nut is interposed between the pair of flanges.

Example 17

The lift table of any one or more of Examples 14-16, wherein the table tilt assembly further comprises a second jack screw having a second engagement feature configured to be engaged by the torque input tool in order to adjust the tilt of the tabletop.

Example 18

The lift table of any one or more of Examples 14-17, wherein the table tilt assembly further comprises a second threaded nut fixed to the table base, wherein the second jack screw is engaged with the second threaded nut.

Example 19

The lift table of any one or more of Examples 14-18, wherein the jack screw and the second jack screw are located on a common longitudinal end of the tabletop assembly.

Example 20

The lift table of any one or more of Examples 14-19, wherein the jack screw and the second jack screw are located on opposite lateral sides of the common longitudinal end of the tabletop assembly.

Example 21

A lift table, comprising: (a) a mobile base member; (b) a tabletop assembly, wherein the tabletop assembly comprises: (i) a table base, (ii) an adjustable top, and (iii) an intermediate frame, wherein the adjustable top and the table base are configured to shift relative to the intermediate frame; (c) a lift assembly operatively coupled with the intermediate frame of the tabletop assembly, wherein the lift assembly is configured to adjust the height of the tabletop assembly relative to the base member between a lowered configuration and a raised configuration; and (d) a plurality of table shift assemblies configured to actuate the table base and the adjustable top relative to the intermediate frame, wherein at least one table shift assembly of the plurality of table shift assemblies comprises: (i) a torque input feature, (ii) a threaded stud attached to the torque input feature, (iii) a complementary threaded through hole defined by the table base, wherein the threaded stud is operatively engaged with the complementary threaded through hole such that rotation of the threaded stud drives translation of the threaded stud relative to the table base, and (iv) an intermediate frame engagement feature located at the end of the threaded stud, wherein the intermediate frame engagement feature is configured to engage the intermediate frame to thereby drive the table base and the adjustable top away from the intermediate frame.

Example 22

The lift table of Example 21, wherein each table shift assembly of the plurality of table shift assemblies comprises a threaded stud.

Example 23

The lift table of any one or more of Examples 21-22, wherein the torque input feature comprises a bolt head.

Example 24

The lift table of any one or more of Examples 21-23, wherein the intermediate frame engagement feature comprises a plastic standoff member.

VIII. Miscellaneous

It should also be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A lift table, comprising:
   (a) a base member;
   (b) a tabletop assembly, wherein the tabletop assembly comprises a table base and an adjustable top, wherein the adjustable top is configured to pivot about a pivot axis relative to the table base such that the adjustable top is configured to define a plurality of angles relative to the table base;
   (c) a lift assembly configured to adjust the height of the tabletop assembly relative to the base member between a lowered configuration and a raised configuration; and
   (d) a table tilt assembly configured to drive the pivoting of the adjustable top relative to the table base between the plurality of angles,
   wherein the table tilt assembly comprises a jack screw having an engagement fitting configured to be engaged by a torque input tool in order to adjust the tilt of the tabletop,
   wherein the table tilt assembly further comprises a threaded nut fixed against movement relative to the table base,
   wherein the jack screw is engaged with the threaded nut,
   wherein the table tilt assembly further comprises a pair of flanges fixed to the table base, and
   wherein the threaded nut is interposed between the pair of flanges.

2. The lift table of claim 1, wherein the table tilt assembly further comprises a second jack screw having a second engagement fitting configured to be engaged by the torque input tool in order to adjust the tilt of the tabletop.

3. The lift table of claim 2, wherein the table tilt assembly further comprises a second threaded nut fixed to the table base, wherein the second jack screw is engaged with the second threaded nut.

4. The lift table of claim 3, wherein the jack screw and the second jack screw are located on a common longitudinal end of the tabletop assembly.

5. The lift table of claim 4, wherein the jack screw and the second jack screw are located on opposite lateral sides of the common longitudinal end of the tabletop assembly.

6. A lift table, comprising:
   (a) a base member;
   (b) a tabletop assembly, wherein the tabletop assembly comprises a table base and an adjustable top, wherein the adjustable top is configured to pivot about a pivot axis relative to the table base such that the adjustable top is configured to define a plurality of angles relative to the table base;
   (c) a lift assembly configured to adjust the height of the tabletop assembly relative to the base member between a lowered configuration and a raised configuration; and
   (d) a table tilt assembly configured to drive the pivoting of the adjustable top relative to the table base between the plurality of angles,
   wherein the table tilt assembly comprises a jack screw having a torque transfer fitting configured to be engaged by a torque input tool in order to adjust the tilt of the tabletop,
   wherein the table tilt assembly comprises a threaded nut fixed against translation relative to the table base,
   wherein the jack screw is engaged with the threaded nut,
   wherein the table tilt assembly comprises a pair of flanges fixed to the table base, and
   wherein the threaded nut is fixed to the pair of flanges in order to fix the threaded nut to the table base.

7. The lift table of claim 6, wherein the table base defines an outer perimeter, and wherein the pair of flanges extend away from the outer perimeter such that the threaded nut is located outside the outer perimeter.

8. The lift table of claim 6, wherein the torque transfer fitting comprises a recessed opening defined by the jack screw.

9. The lift table of claim 6, wherein the lift assembly comprises a scissor lift.

10. The lift table of claim 9, wherein the lift assembly comprises a hydraulic cylinder.

11. The lift table of claim 6, wherein the table tilt assembly comprises a second threaded nut and a second jack screw, and wherein the second threaded nut and the second jack screw are located at a common end of the table base relative to the jack screw and the threaded nut.

12. The lift table of claim 11, wherein the second threaded nut is fixed to the table base.

13. The lift table of claim 12, wherein the second jack screw is threadably coupled to the second threaded nut.

14. The lift table of claim 13, wherein the jack screw and the second jack screw are configured to actuate vertically relative to the table base.

15. A lift table, comprising:
(a) a base member;
(b) a tabletop assembly, wherein the tabletop assembly comprises a table base and an adjustable top, wherein the adjustable top is configured to pivot about a pivot axis relative to the table base such that the adjustable top is configured to define a plurality of angles relative to the table base, and wherein the table base defines an outermost perimeter;
(c) a lift assembly configured to adjust the height of the tabletop assembly relative to the base member between a lowered configuration and a raised configuration; and
(d) a table tilt assembly positioned laterally outside the outermost perimeter defined by the table base, wherein the table tilt assembly is configured to drive the pivoting of the adjustable top relative to the table base between the plurality of angles, and wherein the table tilt assembly comprises a jack screw having a recessed opening configured to be engaged by a torque input tool in order to adjust the tilt of the tabletop, wherein the table tilt assembly comprises a threaded nut fixed against rotation relative to the table base, and wherein the jack screw is engaged with the threaded nut.

16. The lift table of claim 15, wherein the table tilt assembly comprises a threaded nut fixed relative to the table base, and wherein the jack screw is engaged with the threaded nut.

17. The lift table of claim 16, wherein the table tilt assembly further comprises a second threaded nut and a second jack screw.

* * * * *